United States Patent
Song et al.

(10) Patent No.: US 11,561,609 B2
(45) Date of Patent: Jan. 24, 2023

(54) VIRTUAL REALITY CONTROL SYSTEM

(71) Applicant: SKONEC ENTERTAINMENT CO., LTD., Seoul (KR)

(72) Inventors: Chae Hoon Song, Seoul (KR); Se Ho Kang, Seoul (KR)

(73) Assignee: SKONEC ENTERTAINMENT CO., LTD., Seoul (KR)

( * ) Notice: Subject to any disclaimer, the term of this patent is extended or adjusted under 35 U.S.C. 154(b) by 515 days.

(21) Appl. No.: 16/661,729

(22) Filed: Oct. 23, 2019

(65) Prior Publication Data

US 2021/0116990 A1    Apr. 22, 2021

(30) Foreign Application Priority Data

Oct. 21, 2019    (KR) .................. 10-2019-0130978

(51) Int. Cl.
| | |
|---|---|
| *G06F 3/01* | (2006.01) |
| *A63F 13/212* | (2014.01) |
| *G01C 15/00* | (2006.01) |
| *G01S 17/42* | (2006.01) |
| *G02B 27/01* | (2006.01) |

(Continued)

(52) U.S. Cl.
CPC ............ *G06F 3/011* (2013.01); *A63F 13/212* (2014.09); *G01C 15/002* (2013.01); *G01S 17/42* (2013.01); *G02B 27/017* (2013.01); *G06F 3/017* (2013.01); *G06T 19/006* (2013.01); *G09B 9/00* (2013.01); *A63F 2300/8082* (2013.01)

(58) Field of Classification Search
CPC ........ G06F 3/011; G06F 3/017; A63F 13/212; A63F 2300/8082; G01C 15/002; G01S 17/42; G02B 27/017; G06T 19/006; G09B 9/00

See application file for complete search history.

(56) References Cited

U.S. PATENT DOCUMENTS

| | | | |
|---|---|---|---|
| 10,394,327 B2* | 8/2019 | Chizeck | ............... G06F 3/016 |
| 2014/0126767 A1* | 5/2014 | Daon | ................. G06V 20/00 |
| | | | 382/103 |
| 2015/0153835 A1* | 6/2015 | Perez | ................ G06V 20/647 |
| | | | 345/156 |

FOREIGN PATENT DOCUMENTS

| | | | | |
|---|---|---|---|---|
| CN | 104091001 A | * | 10/2014 | |
| WO | WO-2007133209 A1 | * | 11/2007 | ............. G09B 19/00 |

OTHER PUBLICATIONS

Pixo ("Immersive VR Training for First Responders", 2018, https://www.youtube.com/watch?v=S50LnqtwLtU) (Year: 2018).*

* cited by examiner

*Primary Examiner* — Xin Sheng
(74) *Attorney, Agent, or Firm* — Maschoff Brennan

(57) ABSTRACT

According to one aspect of the present invention, a virtual reality control system for providing a chemical accident response training content includes a sensor detecting a light signal, a display displaying an image, at least one controller controlling the display, and a simulator displayed as a valve in the image, wherein the controller is configured to acquire first position data related to the user and second position data related to the simulator based on the light signal, acquire first virtual position data indicating a character corresponding to the user and acquire second virtual position data indicating the valve, and display the character and the valve on the display and display a gas within a predetermined distance from the valve, wherein at least a portion of the gas is not displayed when the character moves while at least a portion of the character is in contact with the valve.

8 Claims, 17 Drawing Sheets

(51) Int. Cl.
*G06T 19/00* (2011.01)
*G09B 9/00* (2006.01)

FIG. 14
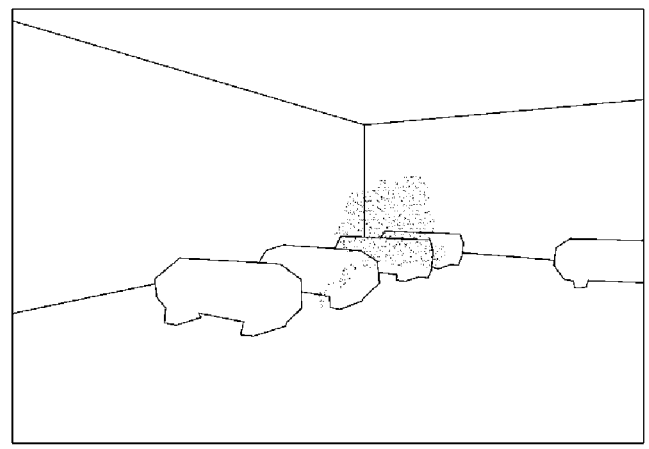
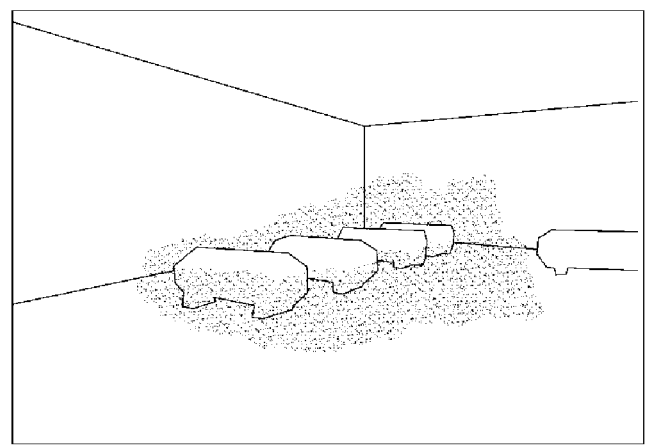

FIG. 15
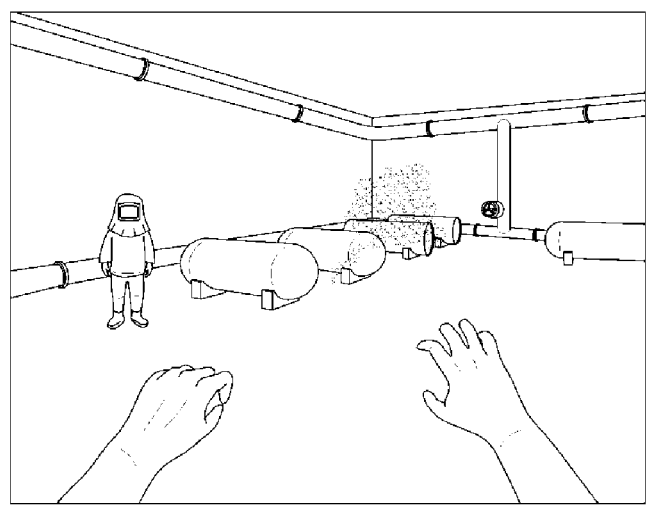
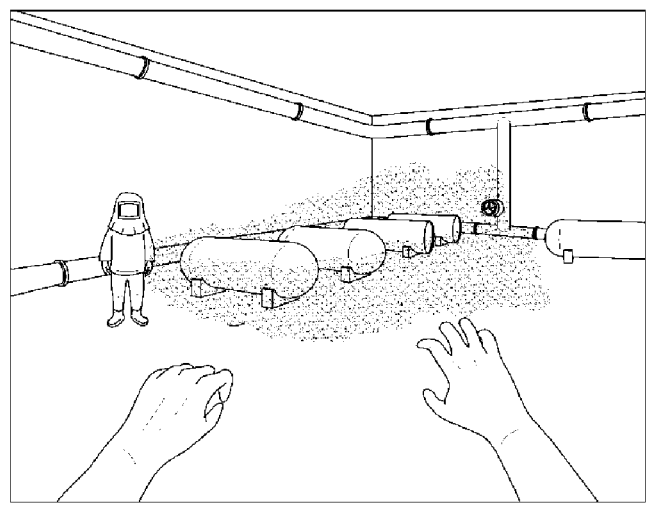

VIRTUAL REALITY CONTROL SYSTEM

CROSS-REFERENCE TO RELATED APPLICATION

This application claims priority to and the benefit of Korean Patent Application No. 10-2019-0130978, filed on Oct. 21, 2019, the disclosure of which is incorporated herein by reference in its entirety.

BACKGROUND

1. Field of the Invention

The present invention relates to a virtual reality control system. The following embodiments relate to a virtual reality control system, and more specifically, to a virtual reality control system which provides a virtual reality based on a position of a user in the real world, thereby virtually providing a situation that is difficult for the user to directly experience.

2. Discussion of Related Art

Virtual reality may be a technology that provides a user with virtual information added to reality or with a state of a target object in the real world as a virtual reality image generated by a program.

Such a technology for providing a virtual reality may include a technology that creates a virtual space, a virtual character, and a virtual object using a program on the basis of information provided in the real world regarding a state of the target object such as a user or an object. In this technology, information on the state of the target object may be acquired using various sensors.

Various disaster situations may be provided to the user using the virtual reality system, and research on methods for improving the feeling of immersion for a user who is experiencing a virtual reality has been actively conducted.

Related arts which provide a virtual reality to a user on the basis of only a position of the user may provide a virtual effect to the user, but have a limitation in providing a tactile effect.

SUMMARY OF THE INVENTION

One object of the present invention is to provide a virtual reality system which establishes an environment similar to an actual disaster to provide a user with virtual reality related to disaster training.

Another object of the present invention is to provide a virtual reality system for providing virtual reality, which allows a user to use a simulator.

Still another object of the present invention is to provide a virtual reality control system which displays that a gas diffuses in a virtual reality provided to a user.

Technical solutions of the present invention may not be limited to the above, and other technical solutions of the present invention will be clearly understandable to those of ordinary skill in the art from the disclosures provided below together with accompanying drawings.

According to one general aspect of the present invention, there is provided a virtual reality control system for providing a chemical accident response training content, the virtual reality control system including a sensor configured to emit and receive light on and from a target object and detect a light signal, a display configured to display an image to a user, at least one controller configured to control the display, and a simulator displayed as a valve in the image, wherein the controller is configured to acquire first position data related to the user and second position data related to the simulator on the basis of the light signal, acquire first virtual position data indicating virtual position of a character that corresponds to the user based on the first position data and acquire second virtual position data indicating virtual position of the valve that corresponds to the simulator based on the second position data, and display the character and the valve on the display based on the first virtual position and the second virtual position and display a gas within a predetermined distance from the valve, wherein at least a portion of the gas is not displayed when the character moves while at least a portion of the character is in contact with the valve.

According to another general aspect of the present invention, there is provided a virtual reality control system for providing disaster training content, the virtual reality control system including a sensor configured to emit and receive light on and from a target object and detect a light signal, a display configured to output an image to a user, at least one controller configured to control the display, and a simulator displayed as a virtual object in the image, wherein the controller is configured to acquire first position data related to the user and second position data related to the simulator based on the light signal, acquire first virtual position data based on the first position data of the user and acquire second virtual position data based on the second position data of the simulator, display a gas for disaster training and the virtual object on the display based on the second virtual position data, and display, on the display, an image in which the gas is removed, when the second virtual position data is changed to third virtual position data in a state in which the first virtual position data and the second virtual position data are placed within a predetermined distance.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 14 is a diagram illustrating diffusion of a gas in a virtual reality according to one embodiment of the present disclosure;

FIG. 15 is a diagram illustrating an example in which a gas and a character are displayed in a virtual reality according to one embodiment of the present disclosure;

DETAILED DESCRIPTION OF EXEMPLARY EMBODIMENTS

Figure 1:
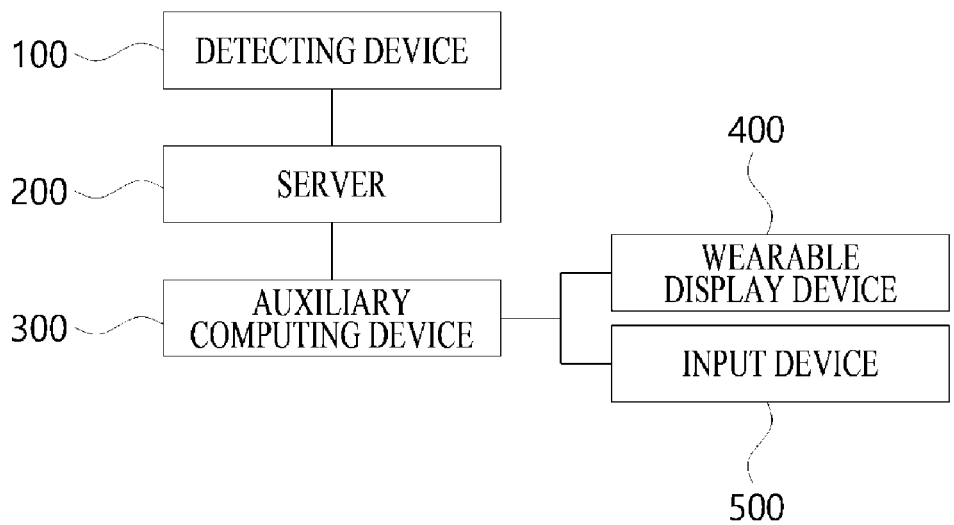
FIG. 1 is a diagram illustrating a virtual reality control system according to one embodiment of the present disclosure.

The above objects, characteristics, and advantages of the present invention will now be described more fully with reference to the accompanying drawings. The invention may, however, be embodied in many different forms and in description that follows, particular embodiments of the invention are illustrated in the accompanying drawings and described in detail.

In the drawings, the thicknesses of layers and regions are exaggerated for clarity. It will also be understood that when a layer is referred to as being "on" another layer or substrate, it can be directly on another layer or substrate, or intervening layers may also be present. Further, like reference numerals will be used to designate like components having similar functions throughout the drawings within the scope of the present disclosure.

Detailed descriptions of related well-known functions that are determined to unnecessarily obscure the gist of the present invention will be omitted. While the terms including an ordinal number, such as "first," "second," etc., may be used to describe various components, such components are not be limited by these terms. The terms first and second should not be used to attach any order of importance but are used to distinguish one element from another element.

Further, in the following description, usage of terms, such as "module," "unit," and "part" used for referring to elements is given merely to facilitate explanation of the present invention, without having any significant meaning by itself.

According to one aspect of the present invention, a virtual reality control system for providing a chemical accident response training content may include a sensor configured to emit and receive light on and from a target object and detect a light signal, a display configured to display an image to a user, at least one controller configured to control the display, and a simulator displayed as a valve in the image, wherein the controller is configured to acquire first position data related to the user and second position data related to the simulator based on the light signal, acquire first virtual position data indicating virtual position of a character that corresponds to the user based on the first position data and acquire second virtual position data indicating virtual position of the valve that corresponds to the simulator based on the second position data, and display the character and the valve on the display based on the first virtual position and the second virtual position and display a gas within a predetermined distance from the valve, wherein at least a portion of the gas is not displayed when the character moves while at least a portion of the character is in contact with the valve.

According to another aspect of the present invention, a virtual reality control system for providing disaster training content may include a sensor configured to emit and receive light on and from a target object and detect a light signal, a display configured to output an image to a user, at least one controller configured to control the display, and a simulator displayed as a virtual object in the image, wherein the controller is configured to acquire first position data related to the user and second position data related to the simulator based on the light signal, acquire first virtual position data based on the first position data of the user and acquire second virtual position data based on the second position data of the simulator, display a gas for disaster training and the virtual object on the display based on the second virtual position data, and display, on the display, an image in which the gas is removed, when the second virtual position data is changed to third virtual position data in a state in which the first virtual position data and the second virtual position data are placed within a predetermined distance.

Here, the virtual object may have a form different from that of the simulator.

The simulator may include a simulator operator operable by the user and a plurality of markers that form a predetermined pattern and the second position data may be position data of at least one of the markers.

The third virtual position data may be acquired from third position data and the second position data and the third position data may be position data of the markers disposed on the simulator operator.

The gas may be displayed as diffusing over time.

The gas may diffuse based on a preset gas diffusion model.

The gas diffusion model may be acquired using at least one of computational fluid dynamics (CFD), a flame acceleration simulator (FLACS), consequence analysis (CA), and process hazard analysis software (PHAST).

The controller may display the gas based on a type of the gas and a density of the gas.

An image in which the gas is removed may be displayed on the display after a delay time elapses from a point in time when the second virtual position data is changed to the third virtual position data in a state in which the first virtual position data and the second virtual position data are placed within the predetermined distance.

The present invention relates to a virtual reality control system which may provide a virtual reality so that a user can experience a situation that is difficult to experience due to space and time constraints or limitations of implementation or occurrence.

Here, the virtual reality may be different from the real world and may be an artificial environment created by a program.

Such virtual reality may be generally classified into a virtual reality (VR) that creates a virtual space separated from reality using a program and provides an image of the virtual space, an augmented reality (AR) that provides a single image by superimposing virtual images on the real world, and a mixed reality (MR) that provides a virtual space by fusing the real world and a virtual reality and provides an image of the virtual space.

In describing virtual reality hereinafter, the virtual reality may refer to a virtual environment that provides various types of virtual spaces, as well as the above-described VR, AR, and MR.

Hereinafter, a virtual reality control system 10 for providing virtual reality according to one embodiment of the present disclosure will be described with reference to FIG. 1.

FIG. 1 is a diagram illustrating a virtual reality control system 10 according to one embodiment of the present disclosure.

Referring to FIG. 1, the virtual reality control system may include a detecting device 100, a server 200, an auxiliary computing device 300, a wearable display device 400, and an input device 500.

According to one embodiment, the detecting device 100 may be connected to the server 200.

The detecting device 100 may acquire detecting data by tracking a target object.

The target object according to one embodiment may be an object that affects an image output through the wearable display device 400. For example, the target object may include at least one of objects having a reference point or a characteristic point, such as the wearable display device 400, a user, the input device 500, and objects located near the user.

In addition, the tracking of the target object according to one embodiment may mean acquiring data on a position of the target object in the reality environment.

For example, by tracking the target object, data on a position that changes according to movement of the target object in the reality environment may be acquired. The position data of the target object may be acquired at predetermined intervals but is not limited thereto.

According to one embodiment, the detecting device 100 may provide the detecting data to the server 200.

According to one embodiment, the server 200 may be connected to the detecting device 100 and the auxiliary computing device 300.

The server 200 may acquire data from the devices connected thereto.

According to one embodiment, the server 200 may acquire at least one of detecting data, image data acquired by the detecting device 100, and state data of the detecting device 100 from the detecting device 100.

In addition, the server 200 may acquire a variety of data according to some embodiments described below.

According to one embodiment, the server 200 may control the devices connected thereto.

According to one embodiment, the server 200 may control the auxiliary computing device 300 or the wearable display device 400.

In one example, the server 200 may control driving a program or application installed in the auxiliary computing device 300. More specifically, the server 200 may control start and/or termination of the program or application installed in the auxiliary computing device 300.

In another example, the server 200 may provide various settings necessary for operation of the detecting device 100.

In addition, the server 200 may generate position data of the target object or generate virtual position data corresponding to a position of the target object in a virtual reality on the basis of the detecting data.

Also, the server 200 may perform authentication of the program or application executed in the auxiliary computing device 300.

The functions of the server 200 according to one embodiment are not limited to the above-described functions, and the server 200 that performs various functions may be provided according to some embodiments.

In addition, the server 200 according to one embodiment is not necessarily provided as a single physical device and may be provided as a plurality of devices that perform individual functions which are subdivided from the above-described functions.

For example, the server 200 may be divided into a detecting server connected to the detecting device 100 and configured to acquire position data on the basis of the detecting data, an operation server configured to control some of the devices provided to the system, and a license server configured to perform authentication of a program or application executed in at least one device among the devices of the virtual reality control system 10, and relevant functions may be performed by the respective servers.

Meanwhile, the server 200 may be provided with an input signal acquired by the auxiliary computing device 300 from the input device 500 or input data based on the input signal.

The input data may include selection data of the user regarding an object or the like, data related to a motion input via the input device 500, and aiming data related to an aiming direction of the input device 500.

The auxiliary computing device 300 may be connected to at least one of the detecting device 100, the server 200, the wearable display device 400, and the input device 500.

The auxiliary computing device 300 may calculate virtual position data on the basis of the position data acquired from the server 200.

Alternatively, the auxiliary computing device 300 may calculate the position data of the target object or calculate the virtual position data by processing the detecting data acquired from the detecting device 100.

The auxiliary computing device 300 may provide an image to the user via the wearable display device 400 through a pre-stored program or application.

In addition, the auxiliary computing device 300 may provide sound data to be provided via the wearable display device 400.

According to one embodiment, the auxiliary computing device 300 may acquire an image to be provided to the user on the basis of the position data through a pre-installed program or application.

In addition, the auxiliary computing device 300 may acquire input data on the basis of the input signal acquired from the input device 500.

In addition, the auxiliary computing device 300 may acquire an image to be provided to the user by taking into account the acquired input data.

The wearable display device 400 may be connected to the auxiliary computing device 300.

The wearable display device 400 may provide an image of a virtual reality to the user.

The wearable display device 400 may visually output the virtual reality image acquired from the auxiliary computing device 300 to the user.

In addition, the wearable display device 400 may output the sound data acquired from the auxiliary computing device 300.

The input device 500 may acquire a signal related to a user's input to be reflected in the virtual reality.

The input device 500 may be connected to the auxiliary computing device 300.

The input device 500 may provide an input signal that corresponds to the user's input to the auxiliary computing device 300.

The input device 500 may include an acceleration sensor, a gyroscope, a gyro sensor, Micro Electro Mechanical Systems (MEMS), a geomagnetic sensor, an inertial measurement sensor (IMIU), an optical sensor, an illuminance sensor, a photo sensor, an infrared sensor, a color sensor, a depth sensor, an electromagnetic wave sensor, and the like for acquiring a signal corresponding to movement of the user.

In addition, the input device 500 may include a button, a switch, a jog shuttle, a wheel, and the like for acquiring a signal related to the user's selection.

In addition, the input device 500 may be connected to the auxiliary computing device 300 through at least one of wired communication and wireless communication.

Also, the input device 500 may include a communication module for communicating with the auxiliary computing device 300.

FIG. 1 illustrates that the input device 500 is connected to the auxiliary computing device 300, but the embodiment is not limited thereto, and the input device 500 may be provided in various connection forms according to the selection.

For example, the input device 500 may be connected to the server 200 and the wearable display device 400 and provide an input signal thereto.

The above-described virtual reality control system 10 is merely an example for convenience of description. The virtual reality control system 10 according to one embodiment is not limited to the configuration and connection relationship shown in FIG. 1 and may be provided in various forms according to the selection.

In one example, the auxiliary computing device 300 and the wearable display device 400 may be provided as one device, and in this case, operations performed in the auxiliary computing device 300 may be implemented in the wearable display device 400.

However, in the following description of the various embodiments, the virtual reality control system 10 will be described as an example for convenience of description.

Hereinafter, a detecting device 100 according to one embodiment of the present disclosure will be described with reference to FIG. 2.

Figure 2:
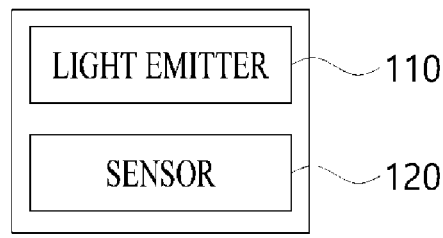
FIG. 2 is a diagram illustrating a detecting device according to one embodiment of the present disclosure.

FIG. 2 is a diagram illustrating a detecting device according to one embodiment of the present disclosure.

Referring to FIG. 2, the detecting device 100 may include a light emitter 110 and a sensor 120.

The light emitter 110 may project a signal to the target object or to the vicinity of the target object for tracking.

In one example, the light emitter 110 may be provided as a light-emitting device that projects an optical signal such as visible light, infrared light, or the like.

More specifically, the light emitter may be provided as a visible-light light emitting diode (LED), an infrared LED, or the like.

The sensor 120 may acquire a signal from an external source.

In one example, the sensor 120 may acquire a signal corresponding to the signal projected from the light emitter 110.

In another example, the sensor 120 may acquire a signal related to light reflected by a marker provided on the target object.

For example, the sensor 120 may be provided as an image sensor, an optical sensor, an illuminance sensor, a photo sensor, an infrared sensor, a color sensor, a depth sensor, an electromagnetic wave sensor, or the like.

Figure 3:
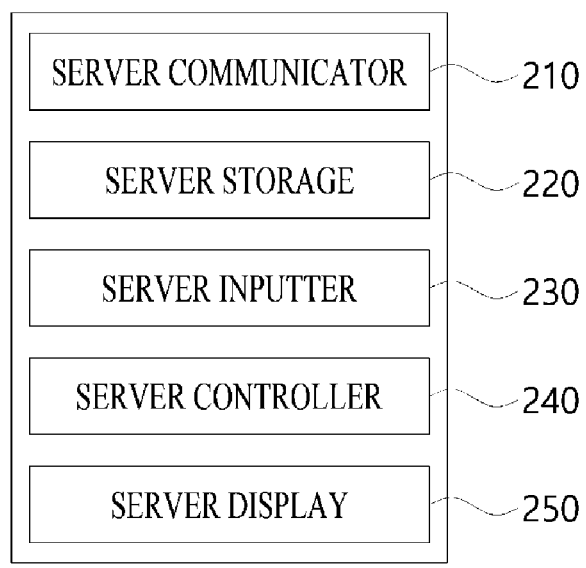
FIG. 3 is a diagram illustrating a server according to one embodiment of the present disclosure.

FIG. 3 is a diagram illustrating a server 200 according to one embodiment of the present disclosure.

Referring to FIG. 3, the server 200 may include a server communicator 210, a server storage 220, a server inputter 230, a server controller 240, and a server display 250.

The server communicator 210 may be connected to at least one of the detecting device 100, the auxiliary computing device 300, the wearable display device 400, and the input device 500 to acquire or provide data therefrom or thereto.

The server communicator 210 may be connected to at least one of the detecting device 100, the auxiliary computing device 300, the wearable display device 400, and the input device 500 through at least one of wired communication and wireless communication.

For example, the wireless communication may include a mobile communication network, such as a Wi-Fi network, a 3rd generation (3G) network, a long-term evolution (LTE) network, a 5G network, and Long Range (LoRA), wireless access in vehicular environment (WAVE), beacon, ZigBee, Bluetooth, Bluetooth low energy, or the like.

In addition, the wired communication may include a twisted-pair cable, a coaxial cable, an optical fiber cable, or the like.

The server communicator 210 may be provided as a communication module for providing at least one of the wired communication and the wireless communication.

The server storage 220 may store data therein.

The server storage 220 may store data acquired from an external source.

In addition, the server storage 220 may store data necessary for operation of the server 200.

For example, the server storage 220 may be provided as a hard disk, a floppy disk, a magnetic medium, such as magnetic tape, an optical medium, such as a compact disc read only memory (CD-ROM), a digital versatile disc, or the like, a magneto-optical medium, such as a floptical disk, a read only memory (ROM), a random access memory (RAM), a flash memory, a solid state drive (SSD), a CD-ROM, a DVD-ROM, a Universal Serial Bus (USB), or the like.

The server inputter 230 may acquire a signal corresponding to an input of the user.

The input of the user may be, for example, a press, a click, a touch, or a drag of a button.

The server inputter 230 may be implemented as, for example, a keyboard, a key pad, a jog shuttle, or a wheel.

The server controller 240 may control an overall operation of the server 200.

For example, the server controller 240 may control the operation of a device included in the server 200.

The server display 250 may output visual data.

The server display 250 may be provided as a monitor, a TV, a display panel, or the like, which outputs visual data.

In addition, when the server display 250 is provided as a touch screen, the server display 250 may perform a function of the server inputter 230.

Figure 4:
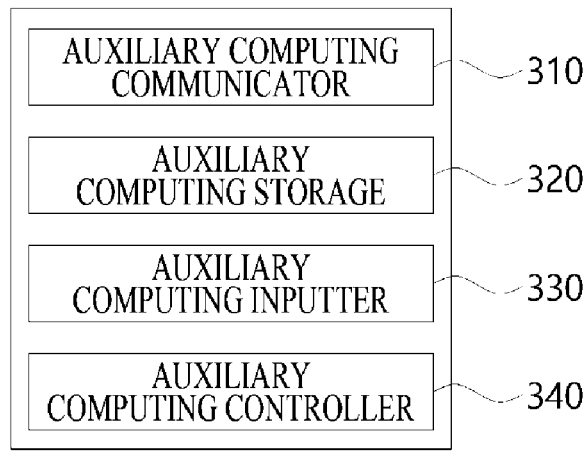
FIG. 4 is a diagram illustrating an auxiliary computing device according to one embodiment of the present disclosure.

FIG. 4 is a diagram illustrating an auxiliary computing device 300 according to one embodiment of the present disclosure.

Referring to FIG. 4, the auxiliary computing device 300 may include an auxiliary computing communicator 310, an auxiliary computing storage 320, an auxiliary computing inputter 330, and an auxiliary computing controller 340.

The auxiliary computing communicator 310 may be connected to at least one of the server 200, the wearable display device 400, and the input device 500.

The auxiliary computing communicator 310 may be connected to at least one of the server 200, the wearable display device 400 and the input device 500 through at least one of wired communication and wireless communication.

The auxiliary computing communicator 310 may exchange data with at least one of the connected server 200, the connected wearable display device, and the connected input device 500.

For example, the wireless communication may include a mobile communication network, such as a Wi-Fi network, a 3G network, an LTE network, a 5G network, and LoRA, WAVE, beacon, ZigBee, Bluetooth, Bluetooth low energy, and the like.

In addition, the wired communication may include a twisted-pair cable, a coaxial cable, an optical fiber cable, or the like.

The auxiliary computing communicator 310 may be provided as a communication module for providing at least one of the wired communication and the wireless communication.

The auxiliary computing storage 320 may store data acquired from an external source.

In addition, the auxiliary computing storage 320 may store data necessary for operation of the auxiliary computing device 300.

Also, the auxiliary computing storage 320 may store therein an application or program therein to provide a virtual experience to the user.

The auxiliary computing inputter 330 may acquire a signal corresponding to an input of the user.

The input of the user may be, for example, a press, a click, a touch, or a drag of a button.

For example, the auxiliary computing inputter 330 may be implemented as, for example, a keyboard, a key pad, a jog shuttle, or a wheel.

The auxiliary computing controller 340 may control an overall operation of the auxiliary computing device 300.

Figure 5:
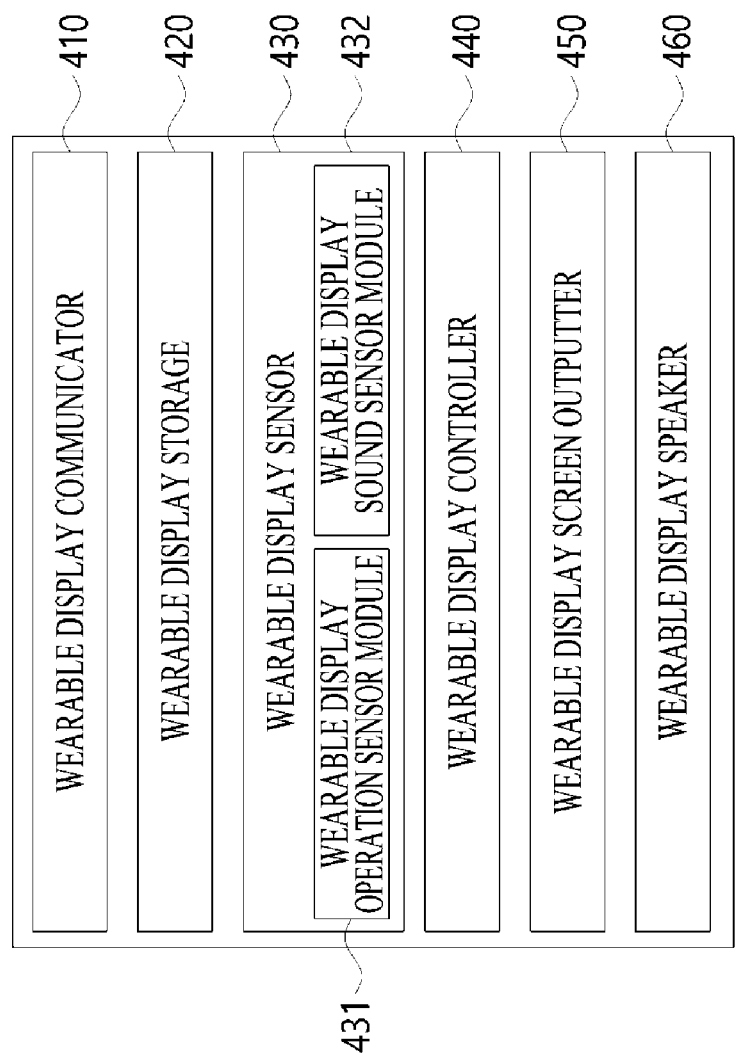
FIG. 5 is a diagram illustrating a wearable display device according to one embodiment of the present disclosure.

FIG. 5 is a diagram illustrating a wearable display device 400 according to one embodiment of the present disclosure.

Referring to FIG. 5, the wearable display device 400 may include a wearable display communicator 410, a wearable display storage 420, a wearable display sensor 430, a wearable display controller 440, a wearable display screen outputter 450, and a wearable display speaker 460.

The wearable display communicator 410 may be connected to the auxiliary computing device 300.

The wearable display communicator 410 may be connected to the auxiliary computing device 300 through at least one of wired communication and wireless communication.

The wearable display storage 420 may store data therein.

The wearable display storage 420 may store an application or program necessary for operation of the wearable display device 400.

In addition, the wearable display storage 420 may store data acquired from an external source.

The wearable display sensor 430 may acquire a state of the wearable display device 400 and a signal corresponding to an input of the user.

The wearable display sensor 430 according to one embodiment may include a wearable display operation sensor module 431 and a wearable display sound sensor module 432.

The wearable display operation sensor module 431 may acquire a signal related to a state of the wearable display device 400.

In one example, the wearable display operation sensor module 431 may acquire rotation data related to a rotation of the wearable display device 400.

In another example, the wearable display operation sensor module 431 may acquire movement data related to a position movement of the wearable display device 400.

The wearable display operation sensor module 431 may include an acceleration sensor, a gyroscope, a gyro sensor, MEMS, a geomagnetic sensor, an IMIU, an optical sensor, an illuminance sensor, a photo sensor, an infrared sensor, a color sensor, a depth sensor, an electromagnetic wave sensor, and the like.

The wearable display sound sensor module 432 may acquire a signal corresponding to a sound externally input.

In one example, the wearable display sound sensor module 432 may be a microphone.

The wearable display controller 440 may control an overall operation of the wearable display device 400.

The wearable display screen outputter 450 may output visual data to the user.

In one example, the wearable display screen outputter 450 may output an image of virtual reality. In another example, the wearable display screen outputter 450 may output an image of a three-dimensional (3D) virtual reality.

The wearable display screen outputter 450 may be provided as an image outputting device, such as a liquid crystal display (LCD), electronic paper, an LED display, organic light emitting diode (OLED) display, a curved display, a stereoscopy (a 3D display using binocular disparity), or the like.

The wearable display speaker 460 may output auditory data.

The wearable display speaker 460 may be provided as a sound device, such as a tuner, a player, an amplifier, a speaker, or the like.

Figure 6:
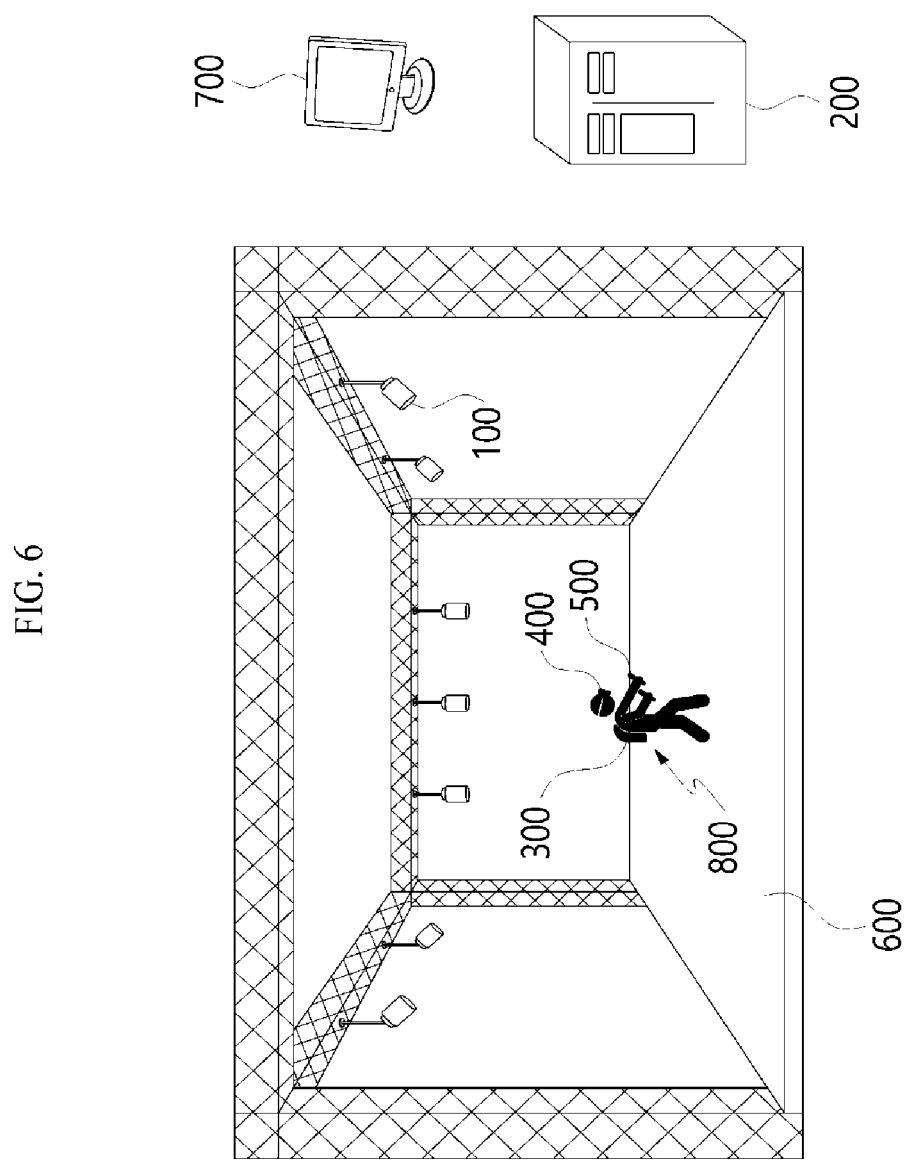
FIG. 6 is a diagram illustrating an implementation example of a virtual reality control system according to one embodiment of the present disclosure.

FIG. 6 is a diagram illustrating an implementation example of a virtual reality control system 10 according to one embodiment of the present disclosure.

Referring to FIG. 6, the virtual reality control system 10 may be implemented by providing at least one user 800 with a tracking area 600 for a virtual experience.

In addition, in the tracking area 600, the user 800 may be provided with at least one of an auxiliary computing device 300, a wearable display device 400, and an input device 500.

In addition, a target object to be provided to the user 800 may be provided with a marker M.

For example, when target objects are the wearable display device 400 and the input device 500, the wearable display device 400 and the input device 500 may be provided with markers M in different patterns.

A pattern in which the marker M is provided will be described below.

In addition, the tracking area 600 may be provided with at least one detecting device 100.

For example, as shown in FIG. 6, the tracking area 600 may be provided with a plurality of detecting devices 100.

The detecting devices 100 may be provided to be spaced apart from each other at predetermined intervals around the periphery of the tracking area 600.

In addition, the detecting devices 100 may be provided to be spaced apart from each other at a predetermined height from the ground.

In addition, the detecting devices 100 may be provided to be oriented toward the tracking area 600.

The detecting devices 100 may be fixedly installed on a pre-installed frame.

For example, as shown in FIG. 6, a frame for installing the detecting devices 100 may be provided around the tracking area 600. In addition, the detecting devices 100 may be fixedly installed on the frame.

The detecting devices 100 may acquire detecting data related to the tracking area 600.

A sensor 120 included in the detecting device 100 may acquire detecting data related to at least a part of the tracking area 600.

The detecting device 100 may provide the detecting data to a server 200 or an auxiliary computing device 300.

For example, the detecting device 100 may provide the detecting data acquired by the sensor 120 to the server 200.

The server 200 may acquire real-time position data of the target object on the basis of the detecting data.

As shown in FIG. 6, when the plurality of detecting devices 100 are provided in the tracking area 600, the server 200 or the auxiliary computing device 300 may acquire detecting data from the plurality of detecting devices 100, and acquire the current position data of the target object on the basis of the acquired detecting data.

In addition, the server 200 or the auxiliary computing device 300 may acquire virtual position data of at least one target object on the basis of position data of target objects.

For example, the auxiliary computing device 300 may acquire coordinates in the virtual reality corresponding to coordinates included in position data of the user 800 in the real world as virtual position data of a character in the virtual reality corresponding to the user 800.

The server 200 may provide at least one of the position data and the virtual position data of the target object to the auxiliary computing device 300.

The auxiliary computing device 300 may calculate the virtual position data on the basis of the acquired position data.

In addition, the auxiliary computing device 300 may acquire a virtual reality image on the basis of the virtual position data.

For example, the auxiliary computing device 300 may construct a virtual reality necessary for a virtual experience using a program or application stored in the auxiliary computing storage 320 and may acquire a field of view from the virtual reality on the basis of the acquired virtual position data. The auxiliary computing device 300 may acquire a virtual reality image on the basis of a field of view in the real world.

The auxiliary computing device 300 may provide the virtual reality image to the wearable display device 400.

The wearable display device 400 may output the virtual reality image to the user 800.

In addition, the server 200 may provide the virtual reality image to a monitoring display device 700.

The server 200 may provide the virtual reality image acquired from the auxiliary computing device 300 to the connected monitoring display device 700.

In addition, when the server 200 is connected to a plurality of auxiliary computing devices 300, the server 200 may acquire a virtual reality image from at least one auxiliary computing device 300 among the plurality of auxiliary computing devices 300 and provide the acquired virtual reality image to the connected monitoring display device 700.

For example, the server 200 may obtain selection of auxiliary computing devices 300 from which the virtual reality image is to be acquired from among the auxiliary computing devices 300 connected to the server 200 through the server inputter 230, and may provide the virtual reality image acquired from the selected auxiliary computing device 300 to the monitoring display device 700.

In addition, the server 200 may acquire the virtual position data from the auxiliary computing device 300 and acquire a virtual reality image on the basis of the acquired virtual position data and a pre-set position of a virtual camera in the virtual reality.

In addition, the server 200 may provide the acquired virtual reality image to the connected monitoring display device 700.

The monitoring display device 700 may output the virtual reality image acquired from the server 200.

In addition, the input device 500 may be provided to be connected to at least one of the server 200, the auxiliary computing device 300, and the wearable display device 400.

In addition, the input device 500 may be provided with at least one marker M.

The input device 500 may be provided such that each user 800 carries the input device 500.

For example, the user 800 may carry the input device 500 in his/her hand.

According to one embodiment, the server 200 may acquire position data of the input device 500 on the basis of the detecting data acquired from the detecting device 100. In addition, the reality position data of the input device 500 may include at least one of position data or orientation direction data of the input device 500 in the tracking area 600.

The auxiliary computing device 300 may determine an orientation direction of a virtual object corresponding to the input device 500 in the virtual reality on the basis of the position data of the input device 500.

In addition, the auxiliary computing device 300 may acquire a virtual image in which the orientation direction of the virtual object corresponding to the input device 500 in the virtual reality is taken into consideration.

For example, the auxiliary computing device 300 may acquire a virtual image in which a gun corresponding to the input device 500 is oriented in a direction corresponding to an orientation direction of the input device 500 in the virtual reality.

In addition, the auxiliary computing device 300 may acquire a virtual image in which the generation of an event in accordance with an event generation command of the user 800 through the input device 500 in the virtual reality is taken into consideration.

For example, when the user 800 presses a switch provided to the input device 500, the auxiliary computing device 300 may acquire a virtual image showing that a character corresponding to the user 800 fires a gun in the virtual reality.

Figure 7:
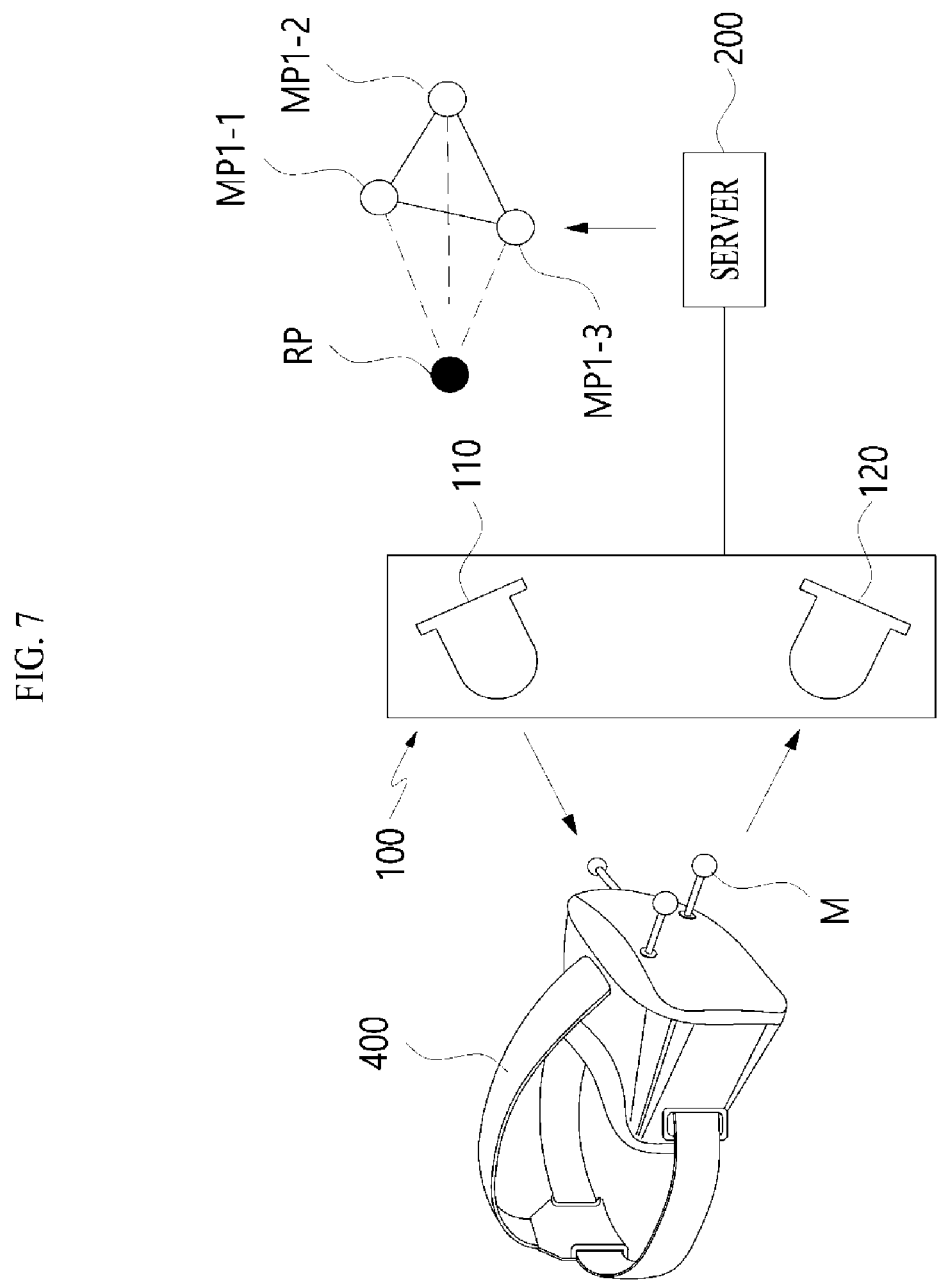
FIG. 7 is a diagram illustrating a method of tracking a target object according to one embodiment of the present disclosure.

FIG. 7 is a diagram illustrating a method of tracking a target object according to one embodiment of the present disclosure.

Referring to FIG. 7, the method of tracking a target object may acquire data related to the target object using an externally provided sensor and determine a position of the target object on the basis of the acquired data related to the target object.

Hereinafter, an example in which the target object is a wearable display device 400 will be described with reference to FIG. 7.

Referring to FIG. 7, the target object may be provided with a marker M for identifying the target object.

The marker M may be provided on the target object and serve as a reference for identifying and tracking the target object.

In order to track a target object, it is necessary to distinguish between the target object and other devices, and it may be possible to identify the target object by providing a marker M to the target object.

In addition, when a plurality of target objects are provided, it is necessary to identify each of the target objects, and to this end, a marker provided on one object may be distinguishable from another marker M provided on another object.

For example, a marker M provided on one target object may be provided in a pattern different from that of another marker M provided on another target object.

In addition, the pattern may include various types of patterns, such as a pattern formed by a plurality of marker M provided at different positions, an optical pattern provided to one display panel, and the like.

The pattern may be formed by marker coordinates of the marker M.

For example, three markers M may be tracked by the detecting device 100 so that first marker coordinates MP1-1, second marker coordinates MP1-2, and third marker coordinates MP1-3 may be acquired as detecting data, and the first marker coordinates MP1-1 to the third marker coordinates MP1-3 may form a triangular-shaped pattern.

In addition, the marker M may be provided as a passive marker, which reflects or absorbs an optical signal projected from a light emitter 110, and an active marker, which autonomously emits an optical signal.

For example, the passive marker may include a three-dimensional model with a light reflective material attached thereto, paper on which a recognizable code is printed, reflective tape, and the like.

In addition, the active marker may include an LED module, a radio wave generator, and the like.

According to one embodiment, the target object may be provided with at least one marker M.

For example, when the virtual reality control system 10 tracks a position of only one object, only one marker M may be provided on the target object.

In addition, even when the virtual reality control system 10 tracks a position of only one object, the target object may be provided with a plurality of markers M.

In addition, when the virtual reality control system 10 tracks positions of a plurality of target objects, one target object may be provided with a plurality of markers M forming a pattern in order to identify each of the plurality of target objects.

For example, when target objects whose positions are tracked by the virtual reality control system 10 are a wearable display device 400 and an input device 500, the wearable display device 400 may be provided with a marker M in a first pattern, and the input device 500 may be provided with a marker M in a second pattern.

The first pattern is different from the second pattern, and the first pattern which is detected during the position tracking may be identified as the wearable display device 400, and the second pattern detected may be identified as the input device 500.

In the above description, when a plurality of target objects are provided, the markers M provided on each of the plurality of objects are provided to form a pattern in order to identify each of the plurality of objects. However, the embodiment is not limited thereto, and even when a single target object is provided, markers M provided on the target object may be formed to form a pattern.

In addition, the pattern of the markers M provided on the target object may be used to identify the user 800.

For example, the first pattern may be identified as the wearable display device 400 worn by a first user and the second pattern may be identified as the input device 500 carried by the first user. In addition, a third pattern may be identified as a wearable display device 400 worn by a second user and a fourth pattern may be identified as an input device 500 carried by the second user.

To track the target object, a server 200 may acquire data related to the target object from the detecting device 100 and acquire detecting data related to a position of the target object on the basis of the acquired data. In addition, the server 200 may calculate the position data of the target object on the basis of the detecting data.

A description of a technique by which the detecting device 100 to provide data related to a target object to the server 200 will be given. The light emitter 110 of the detecting device 100 may project a signal to at least a part of the tracking area 600.

For example, when the light emitter 110 is an infrared LED, the light emitter 110 may project an infrared signal to at least a part of the tracking area 600.

In addition, a sensor 120 may provide data acquired from an external source to the server 200.

In one example, when the sensor 120 is a camera, the sensor 120 may provide an image signal acquired from an external source to the server 200.

Although FIG. 7 illustrates only one sensor 120, the embodiment is not limited thereto. As described in FIG. 6, a plurality of sensors 120 may be provided and each of the plurality of sensors 120 may provide acquired data to the server 200.

The server 200 may determine the position of the target object on the basis of the data acquired from the sensor 120.

The server 200 may determine whether the data acquired from the sensor 120 includes data related to a marker M. In addition, when it is determined that the data related to the marker M is included in the data acquired from the sensor 120, the server 200 may identify the target object on the basis of a pattern of the marker M.

For example, when the data acquired from the sensor 120 includes a first pattern, the server 200 may identify the target object as the wearable display device 400.

A plurality of patterns may be present in the data acquired from one sensor 120, and the server 200 may identify the plurality of patterns.

The patterns may be pre-stored in the server 200, and when the pre-stored pattern is present in the acquired data, the server 200 may determine that the corresponding pattern is present and may identify a target object corresponding to the pattern.

The server 200 may determine the position of the target object on the basis of the data acquired from the sensor 120.

Meanwhile, a representative point RP related to each of the pre-stored patterns may be set in the server 200.

The representative point RP may be a point that represents a pattern.

The representative point RP may be present outside of the pattern.

For example, the representative point RP may be set to a point spaced a predetermined distance from a plane formed by first marker coordinates MK1-1, second marker coordinates MK1-2, and third marker coordinates MK1-3.

When a pattern based on a plurality of markers M is provided, coordinate data related to the plurality of markers M included in the pattern may be acquired and the server 200 may acquire a representative point RP representing the pattern as the position data of the target object to which the pattern is provided.

Therefore, the server 200 may acquire the position data of the target object, thereby being capable of tracking the target object.

The method of tracking a position of a target object is not limited to the above examples, and various types of methods of tracking a position may be used according to selection.

According to one embodiment, when the sensor 120 is provided as an image sensor, the sensor 120 may acquire an external image and acquire position data related to the target object on the basis of the acquired image.

In one example, when the sensor 120 shown in FIG. 7 is provided to the wearable display device 400, the sensor 120 may be provided on one side of the wearable display device 400 and be oriented in an outward direction from the inside of the wearable display device 400 to acquire image data related to the outside of the wearable display device 400.

In addition, the wearable display device 400 may provide the acquired image data to the auxiliary computing device 300.

According to one embodiment, the wearable display device 400 may provide the image data to the auxiliary computing device 300 at a predetermined interval.

For example, the wearable display device 400 may provide the image data to the auxiliary computing device 300 at the same interval as that at which the image data is acquired through the sensor 120.

The auxiliary computing device 300 may acquire at least one characteristic point from the acquired image data.

According to one embodiment, the auxiliary computing device 300 may acquire an object included in the image data as the characteristic point.

According to one embodiment, the auxiliary computing device 300 may acquire an object greater than a predetermined size from among objects included in the image data as the characteristic point.

The auxiliary computing device 300 may identify the objects included in the image data and acquire an object greater than a predetermined size from among the identified objects as the characteristic point. In addition, the auxiliary computing device 300 may determine a size of the object on the basis of the number of pixels occupied by the object included in the image data.

According to one embodiment, the auxiliary computing device 300 may acquire a pre-set type of object from among the objects included in the image data as the characteristic point.

For example, when a ball type object is pre-set, the auxiliary computing device 300 may acquire a ball type object, such as a baseball ball, a soccer ball, a basketball ball, or the like, which is included in the image data, as the characteristic point.

According to one embodiment, the auxiliary computing device 300 may acquire a marker included in the image data as the characteristic point.

The auxiliary computing device 300 may identify a marker, such as a barcode, a quick response (QR) code, or the like, which is included in the image data, and acquire the marker as the characteristic point.

In addition, the auxiliary computing device 300 may determine a position of the characteristic point included in the image data.

The auxiliary computing device 300 may determine at least one of a position change and a size change of the characteristic point on the basis of the image data acquired from the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may determine a position change of the characteristic point on the basis of image data acquired from the wearable display device 400.

The auxiliary computing device 300 may determine a moving direction and a moving distance of the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may compare a position of a characteristic point included in first image data acquired at a first point in time with a position of a characteristic point included in second image data acquired at a second point in time that is later than the first point in time, and when the comparison shows that the characteristic point in the first image data is moved to the right in the second image data, may determine that the wearable display device 400 is moved to the left.

In addition, the auxiliary computing device 300 may determine a moving distance of the characteristic point when the position of the characteristic point is changed.

The auxiliary computing device may determine a moving distance of the characteristic point on the basis of the number of pixels between the position of the characteristic point in the first image data and the position of the characteristic point in the second image data.

Alternatively, the auxiliary computing device 300 may determine a moving distance of the characteristic point on the basis of coordinates of the characteristic point in the first image data and coordinates of the characteristic point in the second image data.

Also, for example, the auxiliary computing device 300 may determine a moving direction and a moving distance of the wearable display device on the basis of the size variation.

The auxiliary computing device 300 may compare a size of a characteristic point included in the first image data acquired at the first point in time with a size of a characteristic point included in the second image data acquired at the second point in time that is later than the first point in time, and when the comparison shows that the position of the characteristic point in the first image data is moved to the right in the second image data, may determine that the wearable display device 400 is moved to the left.

Accordingly, the auxiliary computing device 300 may track the position of the target object on the basis of a change in position of the target object relative to a pre-set initial position.

Figure 8:
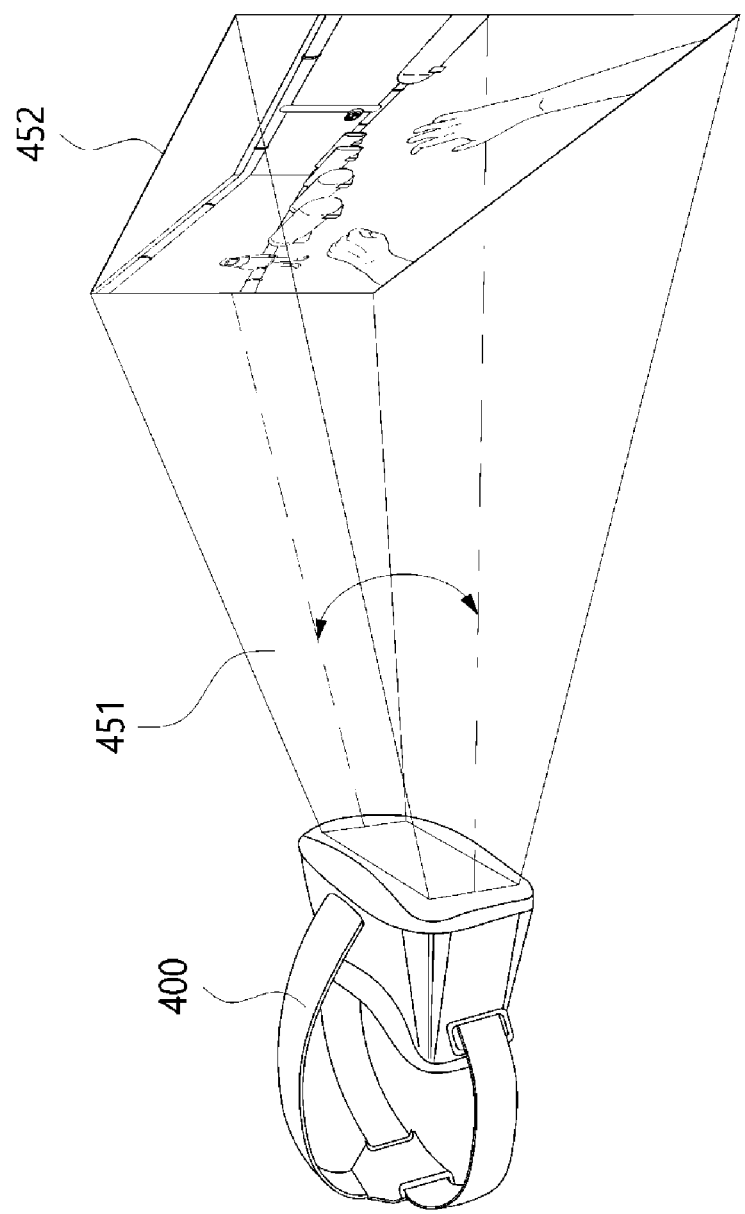
FIG. 8 is a diagram illustrating an example of outputting a virtual reality image through a wearable display device according to one embodiment of the present disclosure.

FIG. 8 is a diagram illustrating an example of outputting a virtual reality image 452 through a wearable display device 400 according to one embodiment of the present disclosure.

Referring to FIG. 8, a virtual reality control system 10 may the a virtual reality image 452 related to at least a part of a virtual reality to a user 800 through the wearable display device 400.

Here, the virtual reality image 452 may be provided through the wearable display device 400 in order for the user 800 to experience the virtual reality, and it is noted that the virtual reality image 452 may be construed as a plurality of image frames that are implemented as images related to a virtual reality or may be construed as an image frame of a specific moment.

The virtual reality image 452 may include a character or a virtual object which is displayed on the basis of virtual position data. In this case, the virtual position data may be calculated on the basis of position data including at least one of position coordinates and an orientation direction of a target object in the real world. For example, the position data may be position coordinates of the target object located in a tracking area 600.

A server 200 may pre-store a coordinate value related to the tracking area 600.

The server 200 may pre-store a coordinate system related to the tracking area 600. The coordinate system may be at least one of a plane coordinate system, an orthogonal coordinate system, a polar coordinate system, a spatial coordinate system, a cylindrical coordinate system, and a spherical coordinate system.

The server 200 may acquire a coordinate value of the target object in the tracking area 600 on the basis of detecting data and the coordinate system related to the tracking area 600. In addition, the server 200 may acquire the acquired coordinate value of the target object in the tracking area 600 as position data.

In one example, when the detecting data is an infrared image, the server 200 may acquire a coordinate value of the marker in the tracking area 600 on the basis of a position of the marker corresponding to the target object in the infrared image and an installation position of the detecting device 100 that has provided the infrared image. In addition, the server 200 may determine a pattern formed by the marker on the basis of the coordinate value of the marker in the tracking area 600 and identify a target object corresponding to the pattern formed by the marker. In addition, the server 200 may acquire a representative point RP of the target object on the basis of the pattern formed by the marker and the coordinate value of the marker in the tracking area 600, and acquire a coordinate value of the representative point RP of the target object as position data of the target object.

The server 200 may provide the position data to the auxiliary computing device 300.

The auxiliary computing device 300 may pre-store a coordinate value related to a virtual reality.

The auxiliary computing device 300 may pre-store a coordinate system related to the virtual reality. The coordinate system may be at least one of a plane coordinate system, an orthogonal coordinate system, a polar coordinate system, a spatial coordinate system, a cylindrical coordinate system, and a spherical coordinate system.

The auxiliary computing device 300 may acquire a coordinate value of a target object in the virtual reality on the basis of the position data and the coordinate system related to the virtual reality.

For example, the auxiliary computing device 300 may acquire a coordinate value in the virtual reality corresponding to a coordinate value included in the reality position data and acquire the acquired coordinate value in the virtual reality as virtual position data.

The auxiliary computing device 300 may acquire the virtual reality image 452 to be output to the user 800 on the basis of the virtual position data.

According to one embodiment, the auxiliary computing device 300 may acquire virtual position data of the wearable display device 400 as virtual position data of a virtual camera and acquire a field of view 451 of the virtual camera on the basis of the virtual position data of the virtual camera and an orientation direction of the virtual camera.

The auxiliary computing device 300 may acquire the orientation direction of the virtual camera on the basis of an orientation direction included in the position data of the wearable display device 400.

In addition, the auxiliary computing device 300 may acquire a predetermined area in the orientation direction of the virtual camera as the field of view 451 of the virtual camera.

As such, by acquiring the field of view 451 of the virtual camera on the basis of the position data of the wearable display device 400, a visual field of the character that corresponds to the user 800 in the real world may be changed according to the movement of the user 800, and the change may be reflected in the virtual reality image 452 to be provided to the user 800.

Meanwhile, the field of view 451 of the virtual camera may be acquired on the basis of specific virtual position data in the virtual reality, as well as the virtual position data of the wearable display device 400.

In addition, the auxiliary computing device 300 may acquire the virtual reality image 452 corresponding to the field of view 451 of the virtual camera in the virtual reality.

The auxiliary computing device 300 may provide the virtual reality image 452 to the wearable display device 400.

The wearable display device 400 may output the acquired virtual reality image 452 to the user 800 through the wearable display screen outputter 450.

Hereinafter, disaster training content that a virtual reality control system 10 according to one embodiment of the present invention provides to a user 800 as part of a virtual experience will be described with reference to FIGS. 9 and 10.

Figure 9:
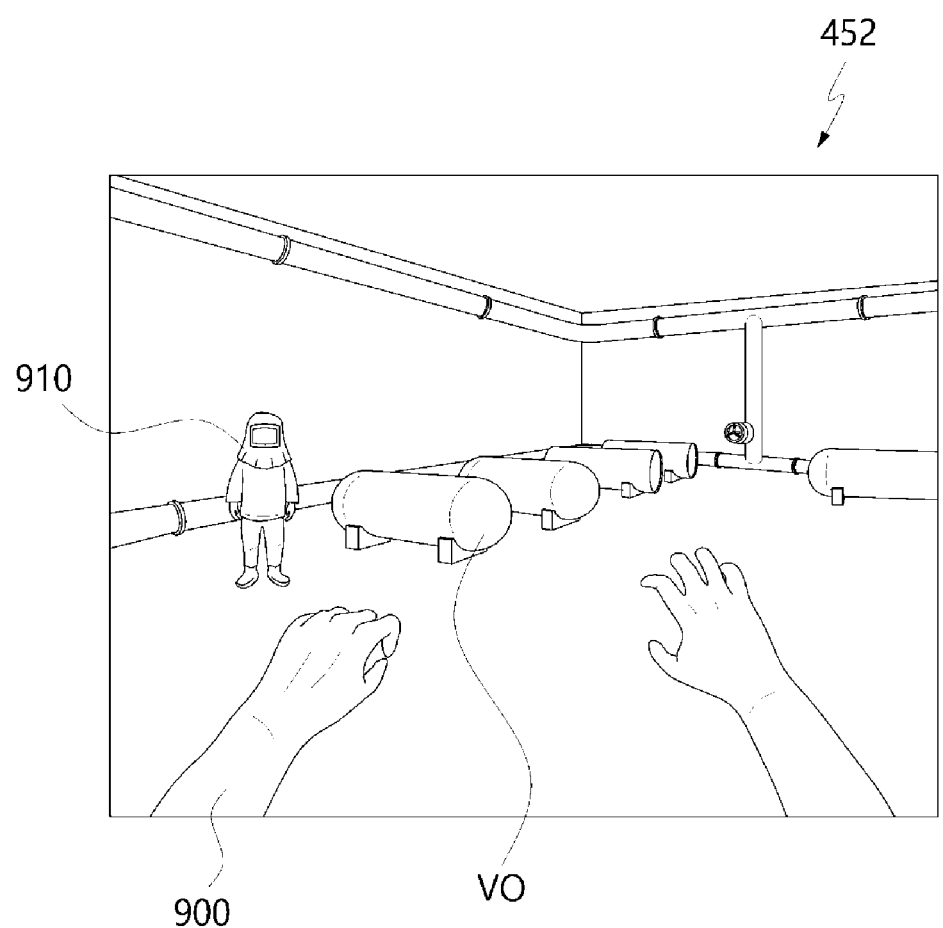
FIG. 9 is a diagram illustrating a virtual reality image according to one embodiment of the present disclosure.

FIG. 9 is a diagram illustrating a virtual reality image 452 according to one embodiment of the present disclosure.

Figure 10:
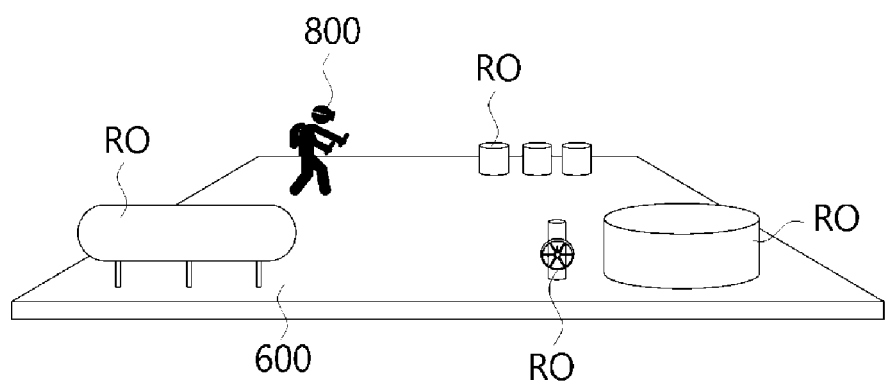
FIG. 10 is a diagram illustrating an example in which a real object is disposed in a tracking area according to one embodiment of the present disclosure.

FIG. 10 is a diagram illustrating real objects RO which are disposed in a tracking area 600 according to one embodiment of the present disclosure.

Referring to FIG. 9, the virtual reality control system 10 may provide the user 800 with content related to disaster training.

Here, disaster training content may include content related to how to prepare for a disaster in advance so as to respond to an event, accident, and problematic situation that may occur in reality. For example, the disaster training content may include training content to respond to a chemical accident that may occur in a factory dealing with chemicals. Accordingly, the user 800 may prepare for a disaster in reality by experiencing the disaster in virtual reality and having substantial training.

Referring back to FIG. 9, the virtual reality control system 10 may provide a virtual reality image 452 related to disaster training in order to provide disaster training content to the user 800.

Here, the virtual reality image 452 may include the background and terrain related to a disaster, a character 900, a peer character 910, and a virtual object VO.

Here, the background and terrain related to a disaster may include terrain features and objects to represent the disaster. For example, in a case in which the disaster is a chemical accident in a chemical plant, the virtual reality image 452 may include factory facilities and chemical facilities, such as vertical/horizontal piping, valves, storage tanks, pumps, or safety equipment.

Here, the character 900 may refer to a character in a virtual reality corresponding to the user 800. For example, the character 900 may be generated on the basis of virtual position data obtained by tracking movement of the user 800 and may move to correspond to a motion of the user 800.

Here, the peer character 910 may include a non-player character (NPC) provided by a pre-stored application or program and characters corresponding to other users excluding the user 800. Specifically, the disaster training content provided by the virtual reality control system 10 may be provided to a plurality of users. In this case, the plurality of users may cooperate with each other and experience a disaster in the virtual reality, and the character 900 that moves in the virtual reality according to the movement of the user 800 and the peer character 910 that corresponds to the movement of another user excluding the user 800 may be provided.

Here, the virtual object VO may be realized in the virtual reality and can be used by the character and may include tools, equipment, facilities, and the like. For example, the virtual object VO may include a hand of the user character 900 and equipment, mechanical equipment, or the like carried by the user character 900 in the virtual reality corresponding to an input device 500 carried by the user 800 in the real world. In another example, the virtual object VO may include a valve, a spanner, a measurer, and the like to control chemical facilities and equipment in the disaster training content.

The virtual object VO may be provided by an application of a program pre-stored in an auxiliary computing device 300. Here, the virtual object VO may be generated on the basis of object data pre-stored in the auxiliary computing device 300 or on the basis of the real object RO in the real world.

Referring to FIG. 10, the virtual reality control system 10 may provide the user 800 with the tracking area 600 including the real objects RO in order to display the virtual object VO in the virtual reality.

Here, the real object RO may vary in form or shape depending on content provided to the user 800 by the virtual reality control system 10. For example, where the virtual reality control system 10 provides the user 800 with disaster training content related to an accident in a factory, the real object RO may include factory facilities and chemical facilities, such as vertical/horizontal piping, valves, storage tanks, pumps, safety equipment, or the like. Meanwhile, the real object RO does not necessarily have a similar form to the virtual object VO provided in the virtual reality. For example, in a case in which the real object RO includes a characteristic point or a marker so that size data, position data, or function data of the real object RO is provided to a detecting device 100, a server 200, or the auxiliary computing device 300, the real object RO may have a different form from that of the virtual object VO that is generated on the basis of the real object RO. However, in a case in which space is allowed in the tracking area 600, the real object RO may have a similar form and shape to the virtual object VO, and in this case, tactile sensation may be provided to the user 800 to improve a sense of immersion of the user 800 in the virtual reality.

The real object RO may include a simulator that executes a preset function automatically or by manipulation of the user 800. For example, when the user 800 who is experiencing the virtual reality applies a force in the tracking area according to the progress of the content, the real object RO may rotate or move to a different position and may provide relevant information to the server 200 or the auxiliary computing device 300. Alternatively, the detecting device 100 may monitor a position change or occurrence of rotation of the real object RO and provide relevant information to the server 200 or the auxiliary computing device 300.

Hereinafter, a simulator 1100 which can be provided to the user 800 as a real object RO will be described with reference to FIG. 11.

Figure 11:
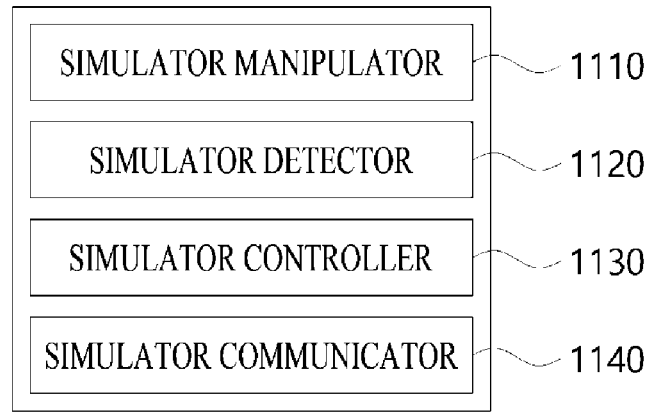
FIG. 11 is a diagram illustrating a configuration of a simulator according to one embodiment of the present disclosure.

Referring to FIG. 11, the simulator 1100 may include a simulator manipulator 1110, a simulator detector 1120, a simulator controller 1130, and a simulator communicator 1140. When the user 800 operates the simulator manipulator 1110, the simulator detector 1120 may provide operation information to the simulator controller 1130 and the simulator controller 1130 may provide the operation information to a server 200 or an auxiliary computing device 300 through the simulator communicator 1140.

The simulator manipulator 1100 may be operated by a physical pressure. For example, when the simulator 1100 is a valve, the simulator manipulator 1110 may include a handle or a lever for opening or closing the valve. Specifically, the user 800 may open or close a gate of the valve by turning the handle or lever of the valve.

The simulator detector 1120 may detect that the simulator manipulator 1110 is being operated. For example, where the simulator 1100 is a valve, the simulator detector 1120 may detect that the handle or lever of the valve moves. Meanwhile, the detecting device 100 may detect that the simulator 1100 is being operated. In this case, the simulator detector 1120 may be omitted.

The simulator controller 1130 may control an overall operation of the simulator 1100. For example, when the user 800 operates the simulator manipulator 1110, the simulator controller 1130 may provide the operation information to the server 200 or the auxiliary computing device 300. Meanwhile, when the detecting device 100 detects the operation of the simulator 1100, the simulator controller 1130 may be omitted.

The simulator communicator 1140 may communicate with the server 200 or the auxiliary computing device 300 in a wired/wireless manner. When the detecting device 100 detects the operation of the simulator 1100, the simulator communicator 1140 may be omitted.

In the foregoing description, the simulator 1100 is described as a valve, but the idea of the present invention is not limited thereto, and the simulator 1100 should be understood to have a concept covering any devices that are operated by manipulation of the user 800 or autonomously operate as long as a preset requirement is satisfied.

In the above description, general information and the configuration of the disaster training content that the virtual control reality system 10 provides to the user are described.

Hereinafter, an event that can be embodied in a virtual reality to provide immersive disaster training content to the user 800 according to one embodiment of the present disclosure will be described with reference to FIG. 12.

Figure 12:
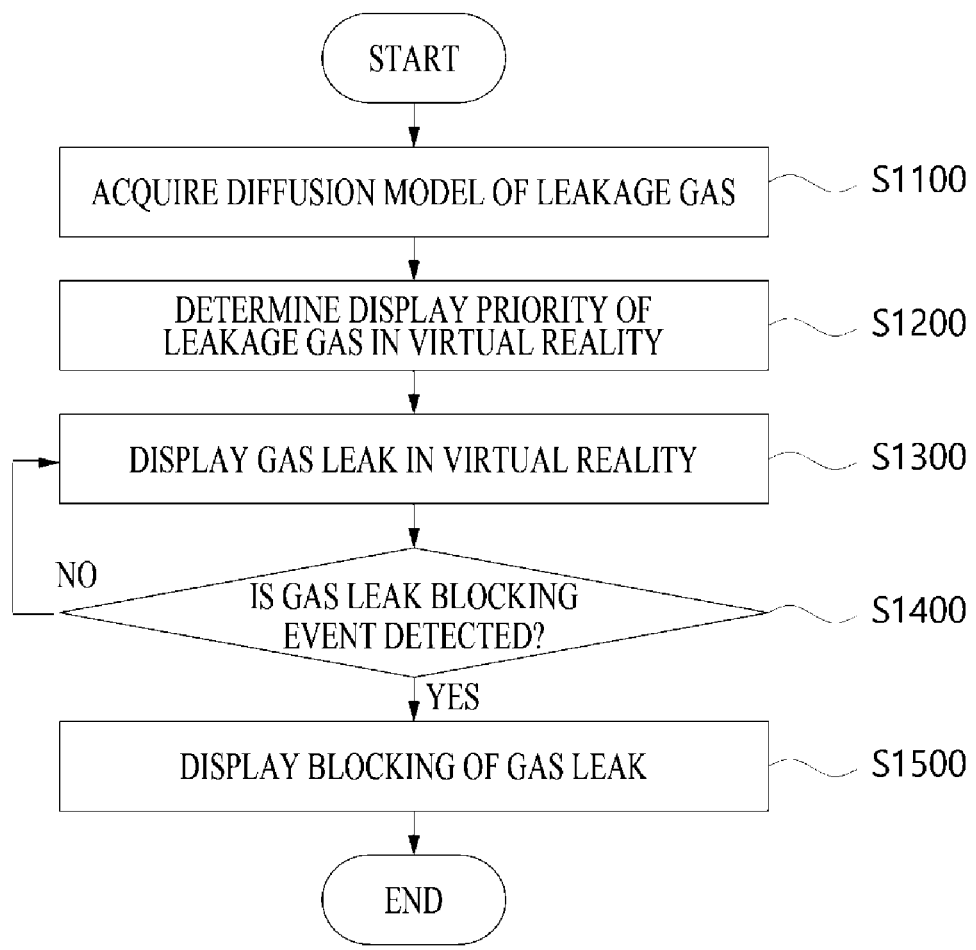
FIG. 12 is a flowchart illustrating a method of displaying a leakage gas in a virtual reality according to one embodiment of the present disclosure.

FIG. 12 is a flowchart illustrating a method of displaying a leakage gas in a virtual reality according to one embodiment of the present disclosure. The virtual reality control system 10 may provide the user 800 with a chemical accident response training program as part of disaster training content. In this case, the virtual reality control system 10 may provide the user 800 with a gas leak situation as one of representative cases of chemical accidents in the virtual reality.

Referring to FIG. 12, the method of displaying a leakage gas may include acquiring a diffusion model of the leakage gas (S1100), determining a display priority of a diffusion gas in the virtual reality (S1200), displaying gas diffusion in the virtual reality (S1300), detecting an event of blocking a gas leak (S1400), and displaying blocking of the gas leak (S1500).

Hereinafter, each of the above-described operations of the method of displaying a leakage gas will be described in detail.

The virtual reality control system 10 may acquire a diffusion model of a leakage gas (S1100).

Here, the diffusion model may mean the form or shape in which a fluid, such as a gas or liquid, diffuses. For example, the diffusion model of a leakage gas may mean a model that shows a direction, speed, or the like of movement of a gas leaking in a chemical accident.

Here, the leakage gas may be set based on properties of the disaster training content provided to the user 800 by the virtual reality control system 10. For example, the leakage gas may include a high-pressure gas, a liquefied gas, a compressed gas, a flammable exhaust gas, and the like.

The virtual reality control system 10 may acquire data related to the diffusion model of the leakage gas using a simulation program or database on gas diffusion.

Meanwhile, the virtual reality control system 10 may simplify the acquired diffusion model of the leakage gas or acquire a common fluid flow model regardless of the kind of the leakage gas. Also, the virtual reality control system 10 may display a leakage gas in the virtual reality using a diffusion model that is preset according to a gas type.

The diffusion model of a leakage gas which is acquired by the virtual reality control system 10 will be described below in more detail.

The virtual reality control system 10 may determine a display priority of a diffusion gas in the virtual reality (S1200).

Here, in a case in which diffusion of a leakage gas is displayed on a wearable display device 400 of the user 800 and the background or a virtual object VO which constitutes the virtual reality, or position data of a peer character 910 overlaps virtual position data of the leakage gas, a display priority of a diffusion gas to be displayed in the virtual reality may be set and the leakage gas may be displayed on the basis of the display priority.

Determining the display priority of the diffusion gas in the virtual reality (S1200) may be omitted.

The virtual reality control system 10 may display diffusion of a gas in the virtual reality (S1300).

The virtual reality control system 10 may display the leakage gas on a virtual reality image 452 which is provided to the user 800 according to the disaster training content provided to the user 800. Specifically, the virtual reality control system 10 may display the leakage gas in the virtual reality on the basis of the virtual position data of the leakage gas that is acquired from the diffusion model of the leakage gas.

The virtual reality control system 10 may determine whether an event of blocking the gas leak is detected (S1400).

The virtual reality control system 10 may determine whether the event of blocking the gas leak occurs on the basis of movement of a character 900 in the virtual reality according to a scenario of the disaster training content provided to the user 800. For example, after a gas leak occurs in the virtual reality, when the character 900 that corresponds to the user 800 operates a valve to block the gas leak or temporarily blocks a gas leak area, the virtual reality control system 10 may determine that an event of blocking the gas leak occurs.

Meanwhile, in addition to detection of the motion of the character 900 in accordance with the movement of the user 800, the virtual reality control system 10 may determine whether the event of blocking the gas leak has occurred by detecting the movement or operation of the simulator 1100. A method of detecting an event of blocking a gas leak using the simulator 1100 will be described below in more detail.

When a gas leak event is detected, the virtual reality control system 10 may display that the gas leak is blocked in the virtual reality (S1500), and when the gas leak event is not detected, the virtual reality control system 10 may continue to display diffusion of the leakage gas in the virtual reality (S1300).

The virtual reality control system 10 may display that the gas leak is blocked in the virtual reality (S1500).

When the event of blocking a gas leak is detected, the virtual reality control system 10 may display that the gas is blocked in the virtual reality. For example, the virtual reality control system 10 may display that the leakage gas is blocked, such as by gradually removing the leakage gas by adjusting the brightness or transparency of the leakage gas displayed in the virtual reality image 452 provided to the user 800.

Meanwhile, when the event of blocking a gas leak is detected, the virtual reality control system 10 may provide a message or sound effect to the virtual reality image 452 provided to the user 800 which informs the user 800 that the gas leak is blocked.

Hereinafter, a detailed method of displaying a leakage gas in a virtual reality using a gas diffusion model will be described with reference to FIGS. 13 to 15.

Figure 13:
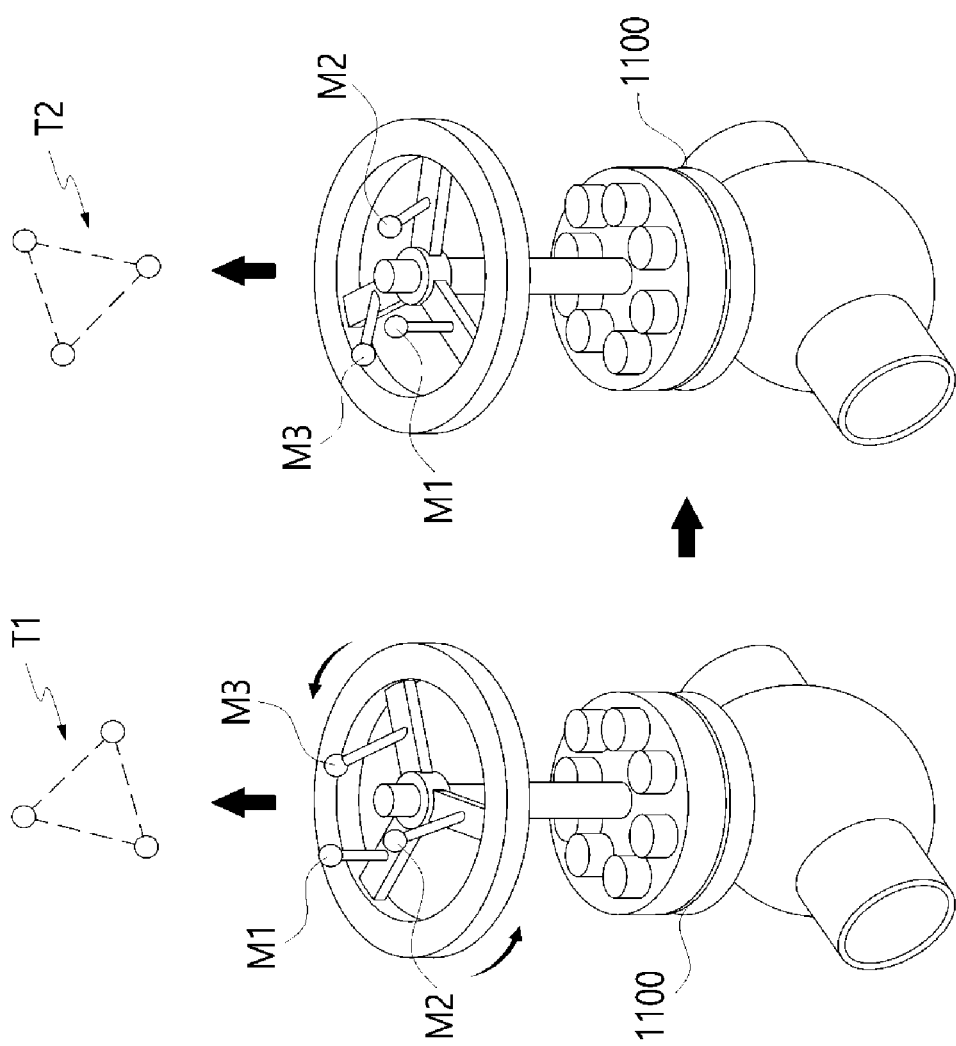
FIG. 13 is a diagram illustrating a gas diffusion model according to one embodiment of the present disclosure.

FIG. 13 is a diagram illustrating a gas diffusion model according to one embodiment of the present disclosure.

FIG. 14 is a diagram illustrating diffusion of a gas in a virtual reality according to one embodiment of the present disclosure.

Referring to FIG. 13, the virtual reality control system 10 may acquire a diffusion model of a gas that leaks in a similar environment to a virtual reality to be provided to the user 800. For example, when the background of the disaster training content provided to the user 800 is a chemical plant having a plurality of storage tanks and a case of a gas leak from a specific storage tank is included in a scenario, the virtual reality control system 10 may acquire a gas diffusion model that assumes the same environment as or a similar environment to the chemical plant.

The diffusion model may be set based on properties of a leakage gas. For example, the diffusion model may be set by taking into account at least one of a leakage rate and a leakage concentration of a leakage gas, a molecular weight or density of a gas, and a gas leaking environment, such as a path through which the gas travels, an ambient temperature, or the like. In this case, in order to obtain a more accurate diffusion model of the leakage gas, the result of observing a fluid flow using a sensor or a fluid dynamics simulation program may be used. Also, the diffusion model may be acquired as a two-dimensional model or a three-dimensional model and acquired as a 2-phase flow or multi-phase flow.

The virtual reality control system 10 may acquire data related to the diffusion model using a simulation program or a database on a gas diffusion model. For example, the virtual reality control system 10 may acquire the diffusion model data using computational fluid dynamics (CFD), a flame acceleration simulator (FLACS), consequence analysis (CA), process hazard analysis software (PHAST), or the like.

The virtual reality control system 10 may acquire data for displaying a gas leak event in the virtual reality from the diffusion model of the leakage gas. For example, the virtual reality control system 10 may calculate virtual position data of the gas leaking in the virtual reality using the diffusion model of the leakage gas. Specifically, the leakage gas diffusion model may include a set of spatial coordinates that change serially by time and the virtual reality control system 10 may calculate the virtual position data of the leakage gas in the virtual reality on the basis of the set of time-varying spatial coordinates. In another example, the leakage gas diffusion model may include function data that can be represented by a graph in two-dimensions or three-dimensions and the virtual reality control system 10 may calculate the virtual position data of the leakage gas in the virtual reality on the basis of the function data.

Referring to FIG. 14, the virtual reality control system 10 may display leakage of a gas in the virtual reality image 452 provided to the user 800 by applying the virtual position data of the leakage gas acquired from the leakage gas diffusion model.

The virtual reality control system 10 may display the leakage gas in the virtual reality image 452 using a different color, transparency, or the like according to the virtual position data of the gas acquired from the diffusion model and the type of the leakage gas.

The virtual reality control system 10 may display the leakage gas in the virtual reality when a preset condition is satisfied. For example, according to the time that elapses after the disaster training content is provided to the user 800, the leakage gas may be displayed in the virtual reality image 452. In another example, the leakage gas may be displayed in the virtual reality image 452 when it is determined that the character 900 in the virtual reality corresponding to the user 800 moves in a preset direction or performs a preset action.

Referring to FIG. 15, the virtual reality control system 10 may simultaneously display the leakage gas and an object in the virtual reality at the same position.

In the virtual reality, the virtual position data of the leakage gas in the virtual reality and virtual position data of the virtual object VO, the character 900, or a peer character 910 can be overlapped. In this case, the virtual reality control system 10 may set priorities of the overlapping virtual position data and display the corresponding objects in the virtual reality image 452 on the basis of the priorities. For example, in a case in which the virtual position data of the peer character 910 overlaps the virtual position data of the leakage gas, the virtual reality control system 10 may display the peer character 910 by giving preference to the virtual position data of the peer character 910.

The virtual reality control system 10 may display the leakage gas in the virtual reality image 452 by adjusting transparency of the leakage gas when the virtual position data of the virtual object VO, the character 900, or the peer character 910 overlaps the virtual position data of the leakage gas.

Hereinafter, a method of detecting a leakage blocking event will be described in more detail with reference to FIG. 16.

Figure 16:
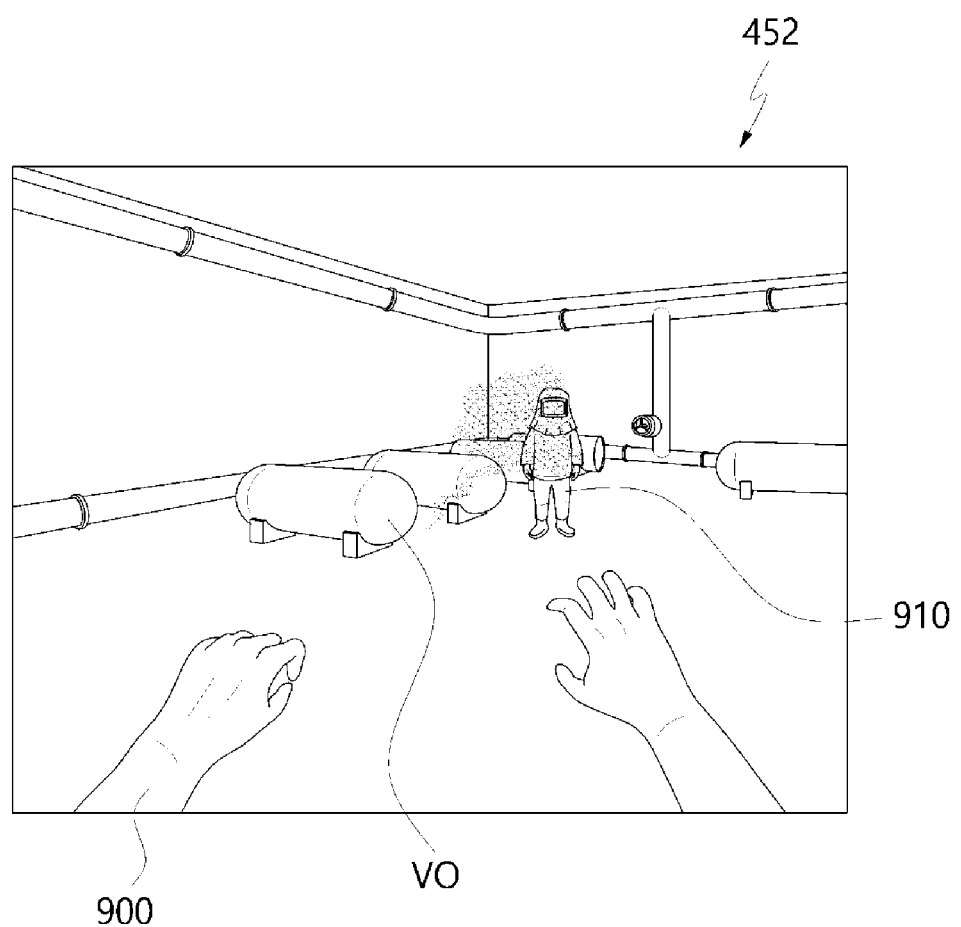
FIG. 16 is a diagram illustrating an operation of a simulator according to one embodiment of the present disclosure.

FIG. 16 is a diagram illustrating an operation of the simulator 1100 according to one embodiment of the present disclosure. The virtual reality control system 10 may detect the occurrence of an event of blocking a leakage gas when the simulator 1100 is operated.

Referring to FIG. 16, the simulator 1100 may include at least one marker M that provides a specific pattern.

Hereinafter, for convenience of description, a vale will be described as one example of the simulator 1100, but the technical idea of the present disclosure is not limited thereto, and the simulator 1100 may mean a simulator 1100 to be provided in a tracking area 600 according to virtual reality content provided to a user 800.

Referring back to FIG. 16, the marker M may be attached to at least a portion of the simulator 1100. For example, the marker M may be attached to a simulator manipulator 1110. Specifically, in a case in which the simulator 1100 is a valve, a first marker M1, a second marker M2, and a third marker M3 may be attached to a handle portion of the valve.

The marker M may be disposed on a portion of the simulator 1100 that is difficult for the user 800 to make contact with. For example, in the case in which the simulator 1100 is a valve, the marker M may be disposed on a shaft or a post of the handle or on a lower portion of the handle.

The marker M may be recognized as a specific pattern by the server 200 or the auxiliary computing device 300 as described in FIG. 7. Referring back to FIG. 16, the first to third markers Ml, M2, and M3 attached to the simulator 1100 may form a triangular pattern.

Meanwhile, the number of markers M included in the simulator 1100 is not limited to the above example and the pattern formed by the markers M included in the simulator 1100 is also not limited to the shape illustrated in FIG. 16. For example, the simulator 1100 may include 4, 5, or more markers M, and the markers M included in the simulator 1100 may form a rectangular, pentagonal, or polygonal pattern.

The virtual reality control system 10 may detect the markers M of the simulator 1100 and display the virtual object VO in the virtual reality. For example, the server 200 or the auxiliary computing device 300 may acquire position data of the markers M included in the simulator 1100 to detect a pattern, may determine a type of the simulator 1100 on the basis of pre-stored information, and may display the simulator 1100 in the virtual reality image 452 in consideration of the position and type of the simulator 1100 in the tracking area 600.

Alternatively, the virtual reality control system 10 may display the simulator 1100 in the virtual reality image 452 in consideration of the position and type of the simulator 1100 on the basis of the virtual position information acquired from the position data of the markers M of the simulator 1100.

Meanwhile, it is apparent that the virtual reality control system 10 may display the virtual object VO that serves the same function in the virtual reality as the simulator 1100 regardless of the presence or absence of the simulator 1100.

The virtual reality control system 10 may detect a change of the pattern, which is formed by the markers M attached to the simulator 1100, in accordance with the operation of the simulator 1100. For example, referring back to FIG. 16, in a case in which the first to third markers M1, M2, and M3 form a first triangular pattern T1 before the simulator 1100 operates, the first to third markers M1, M2, and M3 may form a second triangular pattern T2 after the simulator 1100 operates. In this case, the detecting device 100 may provide the server 200 or the auxiliary computing device 300 with the position data of the markers M attached to the simulator 1100, and the server 200 or the auxiliary computing device 300 may detect that the pattern formed by the markers M attached to the simulator 1100 is changed from the first triangular pattern T1 to the second triangular pattern T2 and may determine that the simulator 1100 has operated. Specifically, in the case in which the simulator 1100 is a valve, the pattern formed by the markers M disposed on a handle is changed when the user 800 turns the handle of the valve, and the server 200 or the auxiliary computing device 300 may detect that the valve handle is turned by acquiring the position data of the markers M from the detecting device 100.

Meanwhile, the virtual reality control system 10 may detect the operation of the simulator 1100 from the position data of the markers M attached to the simulator 1100 and may detect the operation of the simulator 1100 on the basis of the virtual position data acquired from the position data of the markers M attached to the simulator 1100. For example, when the virtual position data acquired from the position data of the markers M attached to the simulator 1100 is changed from first virtual position data to second virtual position data, the virtual reality control system 10 may determine that the simulator 1100 has been operated.

When the simulator 1100 operates, the virtual reality control system 10 may determine that a specific event has occurred in the virtual reality. For example, when the pattern formed by the markers M attached to the simulator 1100 is changed, the virtual reality control system 10 may detect that the simulator 1100 has operated and may detect that an event of blocking a gas leak in the virtual reality has occurred. More specifically, in the case in which the simulator 1100 is a valve, when the handle of the valve is turned by the user 800, the server or the auxiliary computing device 300 may display that the leakage gas is gradually removed or a gas leak is blocked in the virtual reality image 452 provided to the user 800 according to the occurrence of the event of blocking the gas leak.

Hereinafter, a method of displaying that a leakage gas is blocked in a virtual reality will be described in detail with reference to FIG. 17.

Figure 17:
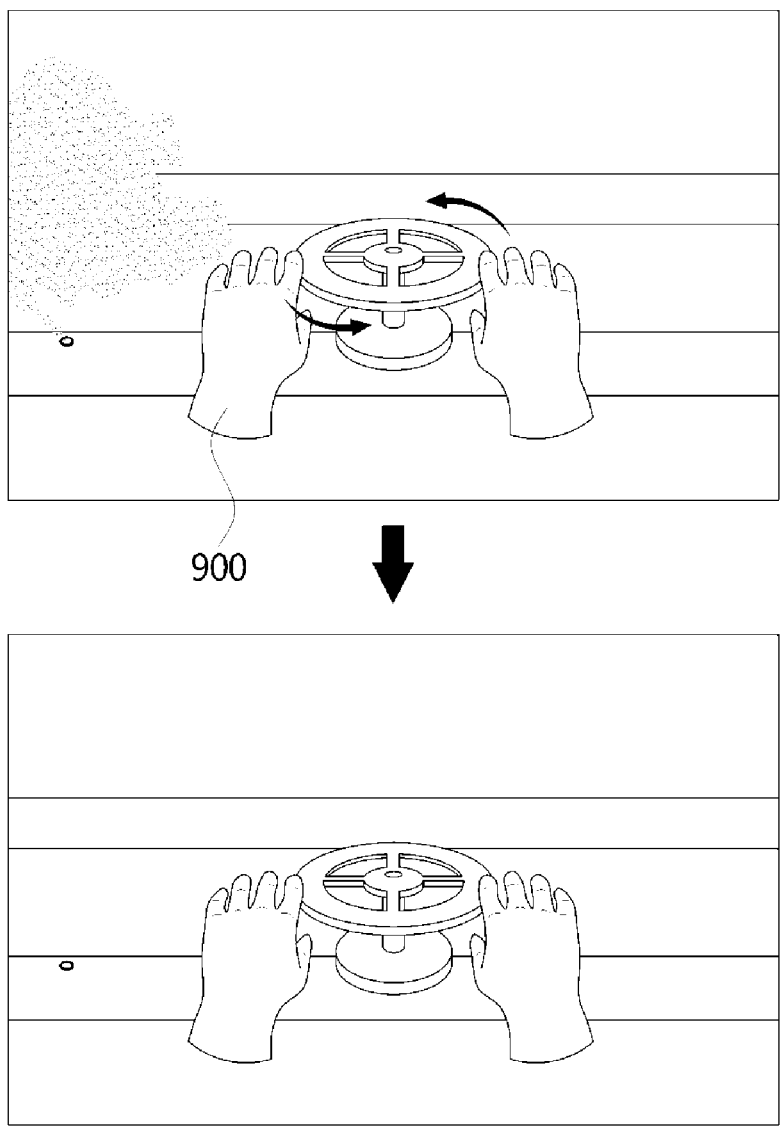
FIG. 17 is a diagram illustrating blocking of a gas by an operation of a virtual operation according to one embodiment of the present disclosure.

FIG. 17 is a diagram illustrating blocking of a gas by an operation of a virtual operation VO according to one embodiment of the present disclosure. The virtual reality control system 10 may detect an event of blocking a gas leak on the basis of virtual position data of the character 900 or the virtual object VO in the virtual reality or the operation of the simulator 1100 and may display, in the virtual reality image 452, that the gas leak is blocked.

Referring to FIG. 17, when a leak blocking event is detected, the virtual reality control system 10 may provide the user 800 with the virtual reality image 452 in which the gas leak is blocked.

For example, the virtual reality control system 10 may determine that the leak blocking event has occurred when at least a portion of the character 900 performs a predetermined motion in a state in which the character 900 is within a predetermined distance from the virtual object VO in the virtual reality. Specifically, when the character 900 turns a valve in the virtual reality, the leakage gas may be blocked.

The virtual reality control system 10 may display blocking of the leakage gas in the virtual reality image 452 on the basis of the movement of the user 800 or the operation of the simulator 1100. For example, the virtual reality control system 10 may set a rate at which the leakage gas disappears, transparency of the leakage gas, or a rate at which a gas leaks on the basis of the amount of change and the change rate of virtual position data of a hand of the character 900. Specifically, the virtual reality control system 10 may reduce the amount of gas leakage as the character 900 turns the handle of the valve faster in the virtual reality or may reduce a gas leakage rate according to the amount of rotation of the handle of the valve. More specifically, the virtual reality control system 10 may display the leakage gas in the virtual reality image 452 by removing the leakage gas by a first ratio or setting the transparency of the leakage gas to a first value when the virtual position data of the hand of the character 900 is changed by a first angle or a first distance, and by removing the leakage gas by a second ratio that is greater than the first ratio or setting the transparency of the leakage gas to a second value that is greater than the first value when the virtual position data of the hand of the character 900 is changed by a second angle that is greater than the first angle or by a second distance that is greater than the first distance.

In another example, the virtual reality control system 10 may set the rate at which the leakage gas disappears or the rate at which the gas leaks according to the operation speed of the simulator 1100 or the amount of change in position or the position change rate of the markers M attached to the simulator 1100. Specifically, the virtual reality control system 10 may adjust the amount of gas leakage on the basis of the movement, rotation speed, or angular speed of the pattern formed by the markers M attached to the simulator 1100. More specifically, the virtual reality control system 10 may display the leakage gas in the virtual reality image 452 by removing the leakage gas by a first ratio or setting the transparency of the leakage gas to a first value when the pattern formed by the markers M attached to the simulator 1100 is changed by a first angle or a first distance, and by removing the leakage gas by a second ratio that is greater than the first ratio or setting the transparency of the leakage gas to a second value that is greater than the first value when the virtual position data of the hand of the character 900 is changed by a second angle that is greater than the first angle or by a second distance that is greater than the first distance.

Meanwhile, the virtual reality control system 10 may display the gas leak in the virtual reality image on the basis of the movement of the user 800 or the operation of the simulator 1100 as opposed to the case described above. For example, the virtual reality control system 10 may display that the leakage gas increases faster or the transparency of the leakage gas is increased in the virtual reality image 452 on the basis of the amount of change and the change rate of the virtual position data of the hand of the character 900. In another example, the virtual reality control system 10 may display that the leakage gas increases faster or the transparency of the leakage gas is increased according to the operation speed of the simulator 1100 or the amount of change in position or the position change rate of the markers M attached to the simulator 1100.

The virtual reality control system 10 may display the leakage gas in the virtual reality image 452 by changing the form or shape of the leakage gas after a predetermined time elapses after the movement of the user 800 or the operation of the simulator 1100. For example, the virtual reality control system 10 may display the leakage gas in the virtual reality image 452 by changing a rate at which the leakage gas disappears, the transparency of the leakage gas, or the rate at which the gas leaks after a predetermined time elapses after the occurrence of the event of blocking the leakage gas.

Here, the predetermined time may mean a delay time between a point in time when an operation of blocking the leakage gas is performed in disaster training and a point in time when the leakage gas is blocked. For example, the delay time may include the time taken for a gas, which has not leaked, to leak from a chemical facility or equipment after the gas leak is blocked by a valve.

Since a delay time exists between a point in time when the user 800 moves or a point in time when the simulator 1100 operates and a point in time when the leakage gas is displayed with the form or shape thereof changed, the virtual reality control system 10 can provide more realistic disaster training content to the user 800, thereby improving the feeling of immersion of the user 800 in the virtual reality.

According to the present invention, the user directly and indirectly experiences a disaster through disaster training content to raise awareness on disasters and conduct training on disasters.

According to the present invention, by realizing a possible disaster in a virtual reality, it is possible to increase the sense of immersion and interest of the user.

According to the present invention, the user may receive a tactile feedback by using the simulator so that the sense of immersion for virtual reality can be enhanced.

Advantageous effects of the present invention are not limited to the aforementioned effects, and other advantageous effects that are not described herein should be clearly understood by those skilled in the art from the above detailed description and the accompanying drawings.

A number of example embodiments have been described above. Nevertheless, it should be understood that various modifications may be made to these example embodiments. For example, suitable results may be achieved when the described techniques are performed in a different order and/or when components in a described system, architecture, device, or circuit are combined in a different manner and/or replaced or supplemented by other components or their equivalents.

Accordingly, other implementations are within the scope of the following claims.

REFERENCE NUMERALS

10: VIRTUAL REALITY CONTROL SYSTEM
100: DETECTING DEVICE
200: SERVER
300: AUXILIARY COMPUTING DEVICE
400: WEARABLE DISPLAY DEVICE
500: INPUT DEVICE

What is claimed is:

1. A virtual reality control system for providing a chemical accident response training content, the virtual reality control system comprising:
a sensor configured to emit and receive light on and from a target object and detect a light signal;
a display configured to display an image to a first user and a second user;
at least one control circuit configured to control the display; and
a simulator displayed as a valve in the image, wherein the simulator comprises a simulator manipulator operable by the first user,
wherein the at least one control circuit is configured to:
acquire a first position data related to the first user, a second position data related to the second user, and a third position data related to the simulator manipulator based on the light signal,
acquire a first virtual position data indicating a first virtual position of a first character that corresponds to the first user based on the first position data, a second virtual position data of a second character that corresponds to the second user based on the second position data, and a third virtual position data indicating a third virtual position of the valve that corresponds to the simulator manipulator based on the third position data of at least one of markers disposed on the simulator manipulator,
display the first character, the second character, and the valve on the display based on the first virtual position data, the second virtual position data, and the third virtual position,
display a gas within a predetermined distance from the valve, when the second virtual position data and virtual data of the gas is overlapped, the gas is displayed based on a displaying priority setting of the gas, and
wherein at least a portion of the gas is controlled to disappear when the first character moves while at least a portion of the first character is in contact with the valve.

2. A virtual reality control system for providing disaster training content, the virtual reality control system comprising:
a sensor configured to emit and receive light on and from a target object and detect a light signal;
a display configured to output an image to a first user and a second user;
at least one control circuit configured to control the display; and
a simulator displayed as a virtual object in the image, wherein the simulator comprises a simulator manipulator operable by the first user,
wherein the at least one control circuit is configured to:
acquire a first position data related to the first user, a second position data related to the second user, and a third position data related to the simulator manipulator based on the light signal,
acquire a first virtual position data indicating a first virtual position of a first character that corresponds to the first user based on the first position data, a second virtual position data indicating a second virtual position of a second character that corresponds to the second user based on the second position data, and a third virtual position data of the virtual object that corresponds to the simulator manipulator based on the third position data of at least one of markers disposed on the simulator manipulator,
display the first character, the second character, and the virtual object on the display based on the first virtual position data, the second virtual position data, and the third virtual position data,
display a gas for disaster training within a predetermined distance from the virtual object wherein when the second virtual position data and a virtual position data of the gas is overlapped, the gas is displayed based on a displaying priority setting of the gas,
when the simulator manipulator is turned by the first user, acquire a turning value of the simulator manipulator based on the third virtual position data and a fourth virtual position data indicating a fourth position data of the at least one of the markers acquired after the simulator manipulator is turned,
based on the acquired turning value, control at least one of a brightness or a transparency of the gas being displayed based on the turning value while the simulator manipulator is being turned by the first user, and based on the acquired turning value being more than a threshold value, control the gas being displayed to disappear.

3. The virtual reality control system of claim 2, wherein the virtual object has a form different from that of the simulator.

4. The virtual reality control system of claim 2, wherein the gas is displayed as diffusing over time.

5. The virtual reality control system of claim 4, wherein the gas diffuses based on a preset gas diffusion model.

6. The virtual reality control system of claim 5, wherein the gas diffusion model is acquired using at least one of computational fluid dynamics (CFD), a flame acceleration simulator (FLACS), consequence analysis (CA), or process hazard analysis software (PHAST).

7. The virtual reality control system of claim 2, wherein the at least one control circuit is configured to display the gas on the display based on a type of the gas and a density of the gas.

8. The virtual reality control system of claim 2, wherein an image in which the gas is removed is displayed on the display after a delay time elapses from a point in time when the third virtual position data is changed to the fourth virtual position data in a state in which the first virtual position data and the third virtual position data are placed within the predetermined distance.

\* \* \* \* \*